US012571366B2

(12) United States Patent
Kantor

(10) Patent No.: US 12,571,366 B2
(45) Date of Patent: Mar. 10, 2026

(54) HYDRO-PNEUMATIC APPARATUS AND METHODS OF USE

(71) Applicant: Denes Lazslo Kantor, Upland, CA (US)

(72) Inventor: Denes Lazslo Kantor, Upland, CA (US)

( * ) Notice: Subject to any disclaimer, the term of this patent is extended or adjusted under 35 U.S.C. 154(b) by 0 days.

(21) Appl. No.: 19/263,899

(22) Filed: Jul. 9, 2025

(65) Prior Publication Data

US 2026/0015990 A1 Jan. 15, 2026

Related U.S. Application Data

(60) Provisional application No. 63/669,692, filed on Jul. 11, 2024.

(51) Int. Cl.
*F03B 17/02* (2006.01)

(52) U.S. Cl.
CPC .................................. *F03B 17/025* (2013.01)

(58) Field of Classification Search
CPC ..................................................... F03B 17/025
See application file for complete search history.

(56) References Cited

U.S. PATENT DOCUMENTS 109,622 A * 11/1870 Hutchinson ............. F04B 17/00 417/329
120,902 A 11/1871 Sawtell
129,791 A 7/1872 Cochrane
190,700 A 5/1877 Bois
349,012 A 9/1886 Surratt et al.
938,078 A * 10/1909 Roed ......................... F04F 1/18 405/76
1,029,030 A * 6/1912 Sander .................. F03B 13/142 405/76

(Continued)

FOREIGN PATENT DOCUMENTS

AU 2011346483 A1 * 8/2013 ............. F03G 7/104
AU 2017225109 A1 * 9/2017 ............. F03G 7/104

(Continued)

OTHER PUBLICATIONS

International Search Report and Written Opinion, PCT/US2025/036927, mailed Sep. 3, 2025.

*Primary Examiner* — Pedro J Cuevas
(74) *Attorney, Agent, or Firm* — Master Key IP, LLP; Justin G. Sanders

(57) ABSTRACT

A hydro-pneumatic apparatus is disclosed and configured for storing and using clean energy derived from hydro-pneumatic fluid displacement. In at least one embodiment, the apparatus provides at least one support frame configured for supporting at least one control container, at least one stationary container, at least one first counterbalance container, and at least one second counterbalance container connected in series with one another via liquid lines and gas lines, with each being airtight and configured for containing one or both of a volume of a liquid and a volume of a gas. The at least one stationary container has a substantially static vertical position relative to the support frame, while each of the at least one control container, first counterbalance container and second counterbalance container have a dynamic vertical position relative to the support frame.

15 Claims, 11 Drawing Sheets

(56) References Cited

U.S. PATENT DOCUMENTS

| | | | | | |
|---|---|---|---|---|---|
| 1,036,587 | A * | 8/1912 | Doyle et al. | F03B 17/02 | 417/329 |
| 1,125,319 | A * | 1/1915 | Hewlett | F04B 49/00 | 417/124 |
| 1,260,204 | A * | 3/1918 | Keithly | F03B 17/02 | 417/41 |
| 1,523,031 | A * | 1/1925 | Mitchell, Jr. | F03B 13/262 | 405/76 |
| 1,544,082 | A * | 6/1925 | Wells | F04F 1/12 | 417/119 |
| 1,597,664 | A * | 8/1926 | Gaskell | F04F 1/12 | 417/119 |
| 2,089,862 | A * | 8/1937 | Sprague | G01L 7/24 | 73/438 |
| 2,555,426 | A * | 6/1951 | Trautman | F04B 47/04 | 91/271 |
| 2,845,950 | A * | 8/1958 | Wadsworth | G01N 1/38 | 137/154 |
| 2,855,860 | A * | 10/1958 | Crump | F04F 1/06 | 137/422 |
| 3,391,903 | A * | 7/1968 | Peterson, Jr. | F03B 13/144 | 415/906 |
| 3,664,364 | A * | 5/1972 | Faure | B01L 3/0203 | 137/240 |
| 3,970,859 | A * | 7/1976 | Riem | F03B 13/06 | 60/397 |
| 4,180,976 | A * | 1/1980 | Bunn | F03B 13/086 | 290/43 |
| 4,209,990 | A * | 7/1980 | Shelton, Jr. | F03G 3/00 | 60/640 |
| 4,508,971 | A * | 4/1985 | Bailey | F03G 6/00 | 290/1 R |
| 4,514,977 | A * | 5/1985 | Bowen | F04F 3/00 | 417/148 |
| 4,660,379 | A * | 4/1987 | Lane | F03B 17/00 | 60/326 |
| 4,739,182 | A * | 4/1988 | Kenderi | F03B 13/148 | 60/398 |
| 4,845,376 | A * | 7/1989 | Bendiks | F03B 13/00 | 290/1 R |
| 5,970,713 | A * | 10/1999 | Iorio | F03G 3/00 | 60/640 |
| 6,359,347 | B1 * | 3/2002 | Wolf | F03B 13/086 | 290/43 |
| 6,445,078 | B1 * | 9/2002 | Cieslak, Jr. | F03B 17/005 | 290/1 R |
| 7,151,322 | B2 * | 12/2006 | Eskandr | F03G 1/028 | 290/1 R |
| 7,579,700 | B1 * | 8/2009 | Meller | F03B 17/005 | 290/43 |
| 7,768,142 | B2 * | 8/2010 | Cieslak, Jr. | F03G 7/104 | 290/1 R |
| 8,266,907 | B2 * | 9/2012 | Barrett | F03B 17/005 | 417/329 |
| 8,297,055 | B2 * | 10/2012 | Ackman | F03B 17/00 | 417/329 |
| 8,905,725 | B2 * | 12/2014 | Roberts | E21B 43/127 | 417/329 |
| 9,121,383 | B2 * | 9/2015 | Nugent | F03B 7/00 | |
| 9,551,316 | B2 * | 1/2017 | Saavedra | F03B 15/00 | |
| 10,954,914 | B2 * | 3/2021 | Torabi | F03G 7/10 | |
| 12,055,122 | B2 * | 8/2024 | Eiselstein | F03B 13/262 | |
| 2006/0163876 | A1 * | 7/2006 | Eskandr | H02K 53/00 | 290/1 R |
| 2009/0115195 | A1 * | 5/2009 | Wang | F03G 7/104 | 290/1 R |
| 2013/0270836 | A1 * | 10/2013 | Quraishy | F03G 3/00 | 185/32 |
| 2016/0208770 | A1 * | 7/2016 | Saavedra | F03B 11/004 | |
| 2017/0175672 | A1 | 6/2017 | VanDyne et al. | | |
| 2022/0316449 | A1 * | 10/2022 | Quraishy | F03G 7/104 | |

FOREIGN PATENT DOCUMENTS

| | | | | | |
|---|---|---|---|---|---|
| AU | 2019257531 | A1 * | 11/2019 | F03G 7/104 |
| BR | 112013016219 | B1 * | 7/2021 | F03G 7/104 |
| CA | 2822542 | A1 * | 6/2012 | F03G 7/104 |
| CN | 103429871 | A * | 12/2013 | F03G 7/104 |
| CN | 109973340 | A * | 7/2019 | F03G 7/104 |
| JP | 2018087574 | A * | 6/2018 | F03G 7/104 |
| JP | 2021175896 | A * | 11/2021 | F03G 7/104 |
| KR | 20180107297 | A * | 10/2018 | F03G 7/10 |
| KR | 20210031001 | A * | 3/2021 | F03G 7/104 |
| WO | WO-2012085947 | A2 * | 6/2012 | F03G 7/104 |

* cited by examiner

HYDRO-PNEUMATIC APPARATUS AND METHODS OF USE

RELATED APPLICATIONS

This application claims priority and is entitled to the filing date of U.S. provisional application Ser. No. 63/669,692, filed on Jul. 11, 2024. The contents of the aforementioned application are incorporated herein by reference.

BACKGROUND

The subject of this patent application relates generally to hydro-pneumatics, and more particularly to a hydro-pneumatic apparatus and associated methods of use for storing and using clean energy derived from hydro-pneumatic fluid displacement.

Applicant(s) hereby incorporate herein by reference any and all patents and published patent applications cited or referred to in this application.

By way of background, Heron's fountain is a hydraulic machine that demonstrates the principles of hydraulics and pneumatics. Flow of water from high gravitational potential energy to low gravitational potential energy causes a fountain to form, due to increasing pressure on the inside of the system. In a bit more detail, and as illustrated in FIG. 1, a Heron's fountain system incorporates an upper container A, a middle container B, and a lower container C. The upper container A is in fluid communication with the lower container C via a first line P1, with an upper end of the first line P1 being positioned proximal to a bottom surface of the upper container A, and an opposing lower end of the first line P1 being positioned proximal to a bottom surface of the lower container C. The middle container B is in fluid communication with the lower container C via a second line P2, with an upper end of the second line P2 being positioned proximal to a top surface of the middle container B, and an opposing lower end of the second line P2 being positioned proximal to a top surface of the lower container C. The upper container A is in fluid communication with the middle container B via a third line P3, with an upper end of the third line P3 being positioned proximal to an top edge of the upper container A, and an opposing lower end of the third line P3 being positioned proximal to a bottom surface of the middle container B. Each of the middle container B and lower container C are sealed and airtight, while the upper container A may either be sealed or open.

The system has an effective height of $H=H_{liquid}+H_{gas}$, which is the difference between a level of liquid in the upper container A and a level of liquid in the lower container C. A left side of the system has a column of height $H_{left}=H_{liquid}+H_{gas}$, entirely full of liquid, whereas a right side of the system has a height $H_{gas}$ full of gas and $H_{liquid}$ full of liquid. The two sides will experience different pressures due to the different component liquids. This pressure difference is what drives the fountain to run. To increase the height of the fountain, $H_{liquid}$ should be minimized, while $H_{gas}$ should be maximized. As $H_{gas}$ increases, so does the pressure at the bottom of the left column. The pressure at the bottom of the column is given by P=ρhg.

The pressure at the bottom of the left column of liquid is $P_{left}=P_{liquid}(H_{gas}+H_{liquid})g$, whereas the pressure at the bottom of the right system of columns is $P_{right}=g(P_{liquid}H_{liquid}+P_{gas}H_{gas})$. Because the gas is lighter than the liquid, $P_{gas}$ is considerably smaller than $P_{liquid}$. This means that as $H_{gas}$ increases, the pressure difference is also increased between $P_{left}>P_{right}$. As the pressure on the left becomes greater than the pressure exerted on the right, the fountain height will increase. It is important here to reiterate that $H_{gas}$ and $H_{liquid}$ are measured from the height of the liquid, not the height of the respective connecting lines or container heights. Again, this is because the pressure exerted in either column is a function of the height of the fluid (whether that be gas or liquid).

With continued reference to FIG. 1, gravity causes liquid (such as water, for example) within the upper container A to flow from the upper container A down through the first line P1 and into the lower container C, displacing gas (such as air, for example) within the lower container C. This displaced gas then moves through the second line P2 and into the middle container B, with the resulting gas pressure pushing liquid from the middle container B up through the third line P3, creating a fountain within the upper container A. This cycle continues until the liquid level in the upper container A rises to meet the upper end of the third line P3, or until the liquid level in the middle container B falls below the lower end of the third line P3, at which point the pressure difference disappears (i.e., equilibrium is reached) and the fountain stops. In order to restart the cycle, the lower container C is emptied of liquid, and the upper container A and middle container B are refilled with liquid, so as to position the liquid higher than the gas within the lower container C.

One of the most efficient forms of electricity production currently involves the use of hydroelectric power plants, which require large dams and very tall structures to accumulate large amounts of water in order to create high pressures that turn turbines. However, in addition to the expense of constructing such hydroelectric power plants, the impact on the environment can also be devastating. Thus, finding more efficient ways to generate large pressures at lower heights will save time, money and reduce the impact on the environment. Water distribution systems must also generate high pressures in order to deliver water to residents. Many municipalities and utility companies build tall water towers and use power hungry motors to move the necessary volumes of water. Accordingly, there remains a need for solutions that are capable of moving large volumes of water relatively more efficiently and cost-effectively, along with solutions for generating clean energy.

Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a hydro-pneumatic apparatus configured for storing and using clean energy derived from hydro-pneumatic fluid displacement. In at least one embodiment, the apparatus provides an at least one support frame configured for supporting an at least one control container, an at least one stationary container, an at least one first counterbalance container, and an at least one second counterbalance container connected in series with one another. Each of the at least one control container, stationary container, first counterbalance container and second counterbalance container are airtight and configured for containing one or both of a volume of a liquid and a volume of a gas. Each of the at least one stationary container is fixedly engaged with or otherwise positioned on the support frame so as to have a substantially static vertical position relative to the support frame. Each of the at least one control container, first counterbalance container and second counterbalance container is movably engaged with or otherwise positioned on the support frame so as to have a dynamic vertical position relative to the support frame. The at least one control container is configured for moving between one of an upper control position—wherein the at least one control container is positioned proximal to an upper end of the support frame—and a lower control position—wherein the at least one control container is positioned proximal to an opposing lower end of the support frame. The at least one first counterbalance container is configured for moving between one of an upper counterbalance position—wherein the at least one first counterbalance container is positioned proximal to the upper end of the support frame—and a lower counterbalance position—wherein the at least one first counterbalance container is positioned proximal to the lower end of the support frame. The at least one second counterbalance container is configured for moving between one of an upper counterbalance position—wherein the at least one second counterbalance container is positioned proximal to the upper end of the support frame—and a lower counterbalance position—wherein the at least one second counterbalance container is positioned proximal to the lower end of the support frame. A first one of the at least one control container is in direct fluid communication with a first one of the at least one first counterbalance container via a liquid line positioned and configured for allowing a volume of liquid to pass between said control container and said first counterbalance container during use of the apparatus, a first end of the liquid line positioned proximal to a bottom surface of said control container, and an opposing second end of the liquid line positioned proximal to a bottom surface of said first counterbalance container. The first one of the at least one first counterbalance container is further in direct fluid communication with a first one of the at least one second counterbalance container via a gas line positioned and configured for allowing a volume of gas to pass between said first counterbalance container and said second counterbalance container during use of the apparatus, a first end of the gas line positioned proximal to a top surface of said first counterbalance container, and an opposing second end of the gas line positioned proximal to a top surface of said second counterbalance container. The first one of the at least one second counterbalance container is further in direct fluid communication with a first one of the at least one stationary container via a liquid line positioned and configured for allowing a volume of liquid to pass between said second counterbalance container and said stationary container during use of the apparatus, a first end of the liquid line positioned proximal to a bottom surface of said second counterbalance container, and an opposing second end of the liquid line positioned proximal to a bottom surface of said stationary container. The first one of the at least one stationary container is further in direct fluid communication with the first one of the at least one control container via a gas line positioned and configured for allowing a volume of gas to pass between said stationary container and said control container during use of the apparatus, a first end of the gas line positioned proximal to a top surface of said stationary container, and an opposing second end of the gas line positioned proximal to a top surface of said control container.

In at least one other embodiment, the apparatus provides an at least one support frame configured for supporting a first control container, a plurality of stationary containers, a plurality of first counterbalance containers, a plurality of second counterbalance containers, and a plurality of second control containers connected in series with one another. Each of the first control container, stationary containers, first counterbalance containers, second counterbalance containers, and second control containers is airtight and configured for containing one or both of a volume of a liquid and a volume of a gas. Each of the stationary containers is fixedly engaged with or otherwise positioned on the support frame so as to have a substantially static vertical position relative to the support frame. Each of the first control container, first counterbalance containers, second counterbalance containers, and second control containers is movably engaged with or otherwise positioned on the support frame so as to have a dynamic vertical position relative to the support frame. The first control container is configured for moving between one of an upper control position—wherein the first control container is positioned proximal to an upper end of the support frame—and a lower control position—wherein the first control container is positioned proximal to an opposing lower end of the support frame. The first counterbalance containers are configured for moving between one of an upper counterbalance position—wherein the first counterbalance containers are positioned proximal to the upper end of the support frame—and a lower counterbalance position—wherein the first counterbalance containers are positioned proximal to the lower end of the support frame. The second counterbalance containers are configured for moving between one of an upper counterbalance position—wherein the second counterbalance containers are positioned proximal to the upper end of the support frame—and a lower counterbalance position—wherein the second counterbalance containers are positioned proximal to the lower end of the support frame. The second control containers are configured for moving between one of an upper control position—wherein the second control containers are positioned proximal to the upper end of the support frame—and a lower control position—wherein the second control containers are positioned proximal to the lower end of the support frame. The first control container is in direct fluid communication with a first one of the first counterbalance containers via a liquid line positioned and configured for allowing a volume of liquid to pass between the first control container and said first counterbalance container during use of the apparatus, a first end of the liquid line positioned proximal to a bottom surface of the first control container, and an opposing second end of the liquid line positioned proximal to a bottom surface of said first counterbalance container. The first one of the first counterbalance containers is further in direct fluid communication with a first one of the stationary containers via a gas line positioned and configured for allowing a volume of gas to pass between said first counterbalance container and said stationary container during use of the apparatus, a first end of the gas line positioned proximal to a top surface of said first counterbalance container, and an opposing second end of the gas line positioned proximal to a top surface of said stationary container. The first one of the stationary containers is further in direct fluid communication with a further one of the first counterbalance containers via a liquid line positioned and configured for allowing a volume of liquid to pass between said stationary container and said first counterbalance container during use of the apparatus, a first end of the liquid line positioned proximal to a bottom surface of said stationary container, and an opposing second end of the liquid line positioned proximal to a bottom surface of said first counterbalance container. Remaining ones of the first counterbalance containers and stationary containers are thereafter interconnected in series in an alternating arrangement, such that further liquid lines extend between and interconnect further ones of the remaining stationary containers and first counterbalance containers proximal to a bottom surface of each of said remaining stationary containers and first counterbalance containers, while further gas lines extend between and interconnect further ones of the remaining first counterbalance containers and stationary containers proximal to a top surface of each of said remaining first counterbalance containers and stationary containers. A last one of the first counterbalance containers is further in direct fluid communication with a first one of the second counterbalance containers via a gas line positioned and configured for allowing a volume of gas to pass between said first counterbalance container and said second counterbalance container during use of the apparatus, a first end of the gas line positioned proximal to a top surface of said first counterbalance container, and an opposing second end of the gas line positioned proximal to a top surface of said second counterbalance container. The first one of the second counterbalance containers is further in direct fluid communication with a first one of the second control containers via a liquid line positioned and configured for allowing a volume of liquid to pass between said second counterbalance container and said second control container during use of the apparatus, a first end of the liquid line positioned proximal to a bottom surface of said second counterbalance container, and an opposing second end of the liquid line positioned proximal to a bottom surface of said second control container. The first one of the second control containers is further in direct fluid communication with a further one of the second counterbalance containers via a gas line positioned and configured for allowing a volume of gas to pass between said second control container and said second counterbalance container during use of the apparatus, a first end of the gas line positioned proximal to a top surface of said second control container, and an opposing second end of the gas line positioned proximal to a top surface of said second counterbalance container. Remaining ones of the second counterbalance containers and second control containers are thereafter interconnected in series in an alternating arrangement, such that further gas lines extend between and interconnect further ones of the remaining second control containers and second counterbalance containers proximal to a top surface of each of said remaining second control containers and second counterbalance containers, while further liquid lines extend between and interconnect further ones of the remaining second counterbalance containers and second control containers proximal to a bottom surface of each of said remaining second counterbalance containers and second control containers. A last one of the second control containers is further in direct fluid communication with the first control container via a gas line positioned and configured for allowing a volume of gas to pass between said second control container and the first control container during use of the apparatus, a first end of the gas line positioned proximal to a top surface of said second control container, and an opposing second end of the gas line positioned proximal to a top surface of the first control container.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
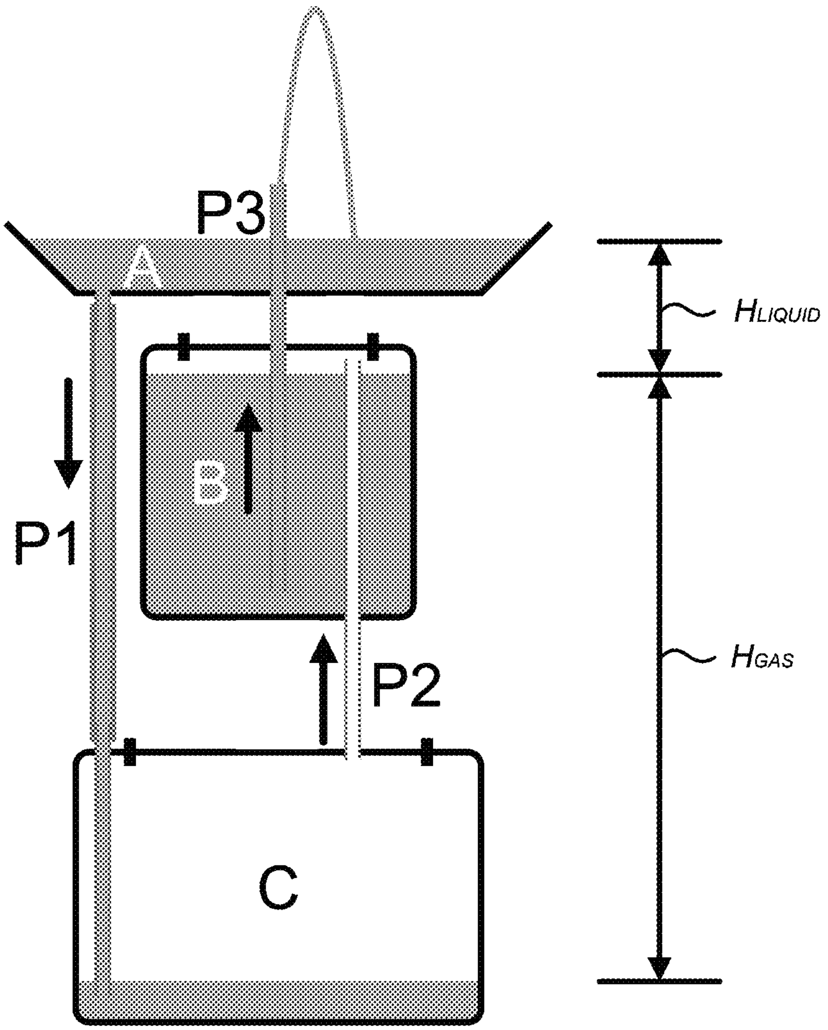
Fig. 1 (prior art)
FIG. 1 is a diagram of a prior art Heron's fountain system.
Figure 2:
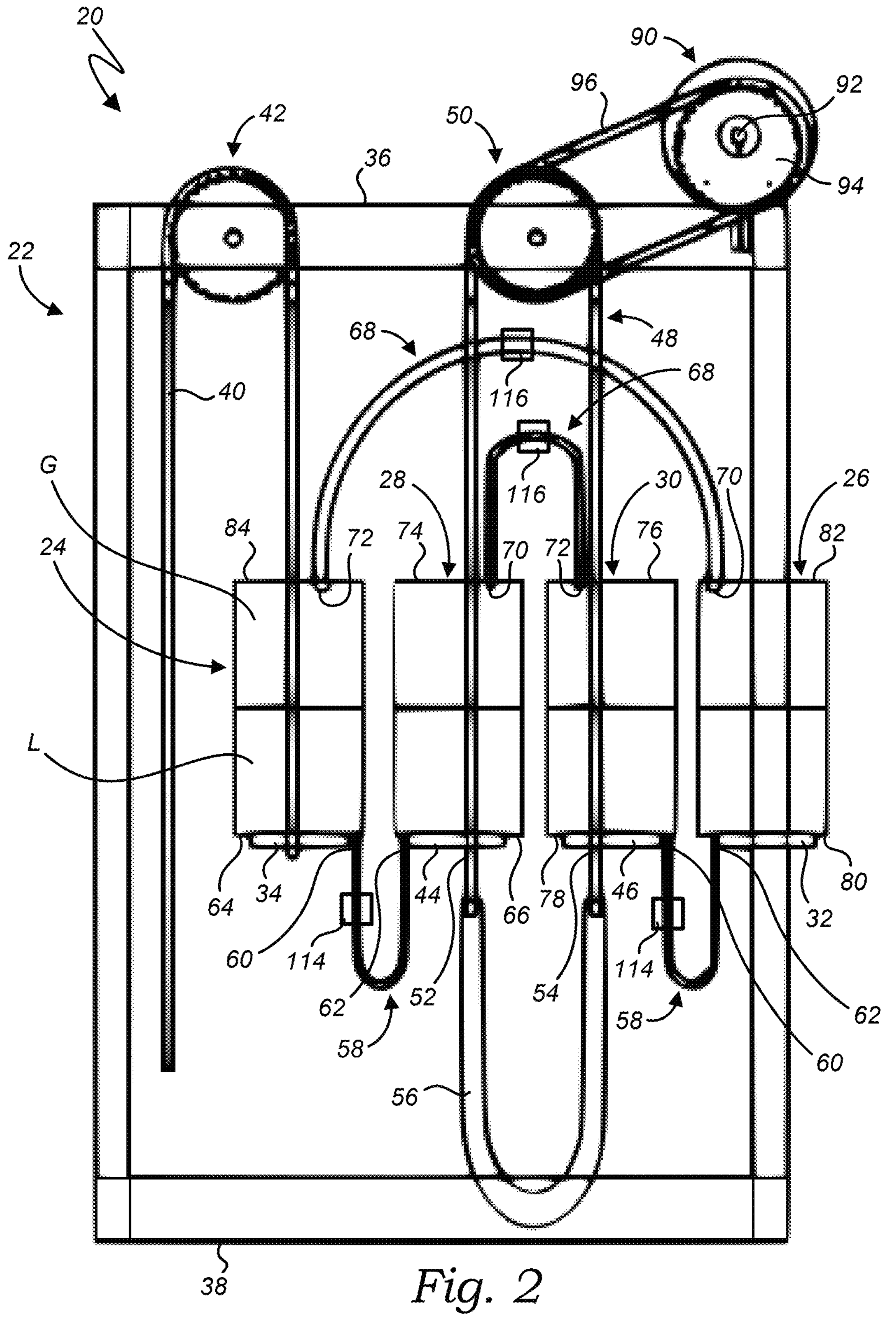
FIGS. 2-4 are side elevational views of an exemplary hydro-pneumatic apparatus, in accordance with at least one embodiment.
Figure 3:
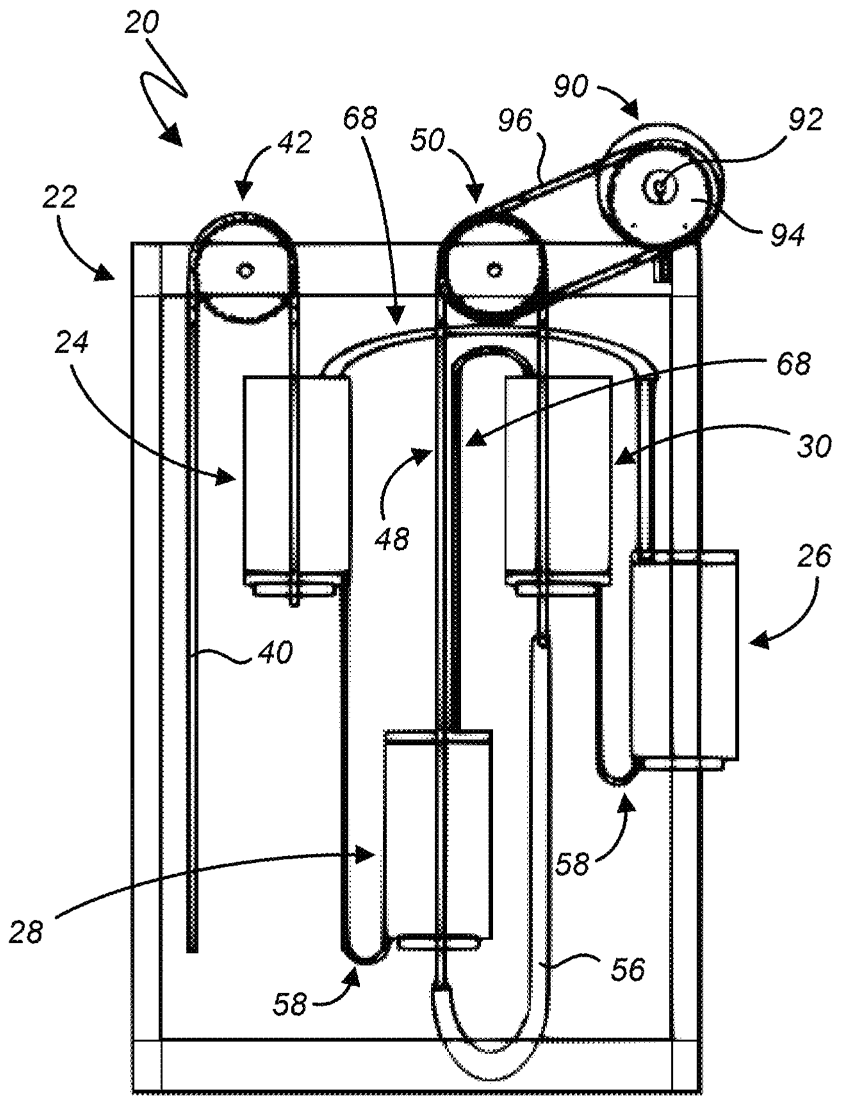
Figure 4:
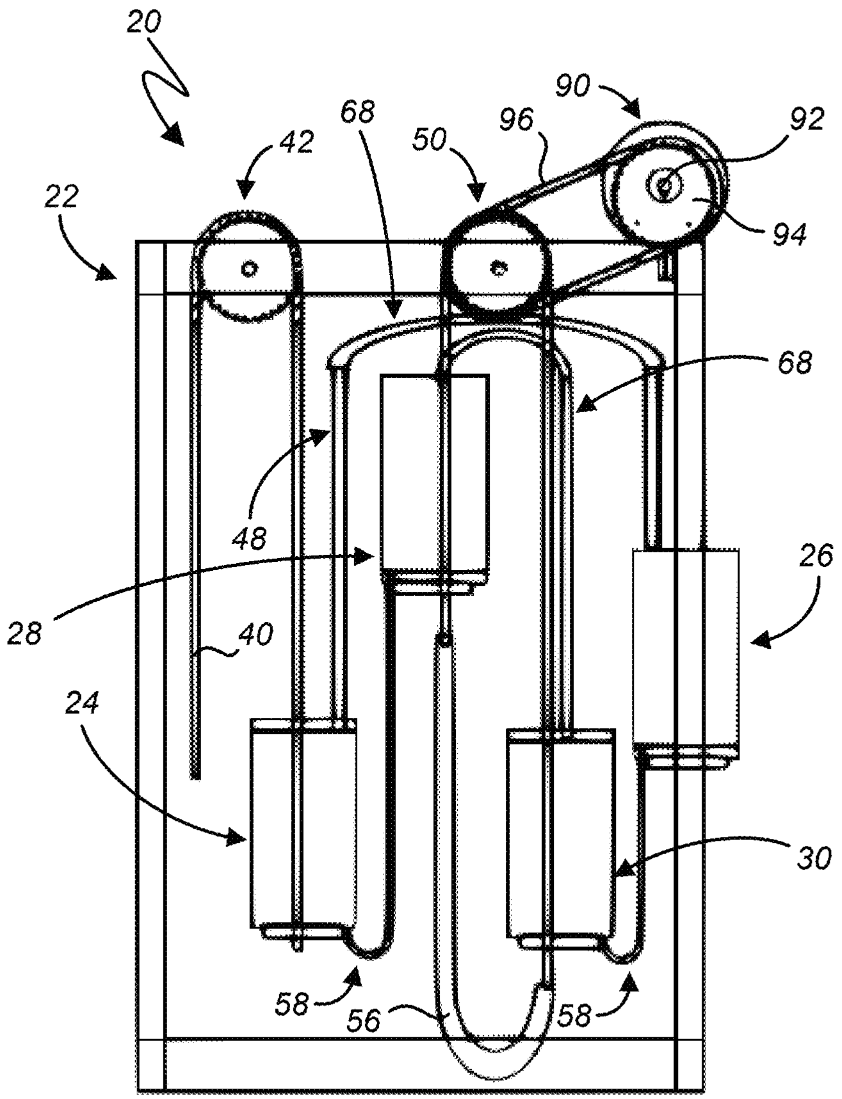

Turning now to FIGS. 2-4, there are shown side elevational views of an exemplary embodiment of a hydro-pneumatic apparatus 20. In at least one embodiment, the apparatus 20 provides an at least one support frame 22 configured for supporting an at least one control container 24, an at least one stationary container 26, an at least one first counterbalance container 28, and an at least one second counterbalance container 30 connected in series with one another, as described further below. In at least one embodiment, as described further below, each of the at least one control container 24, stationary container 26, first counterbalance container 28 and second counterbalance container 30 is airtight and configured for containing one or both of a volume of a liquid L and a volume of a gas G. In at least one embodiment, the liquid L is water; however, in further embodiments, the liquid L may be any other liquid L, or combinations of liquids L, now known or later developed, so long as the apparatus 20 is capable of substantially carrying out the functionality described herein. Additionally, in at least one embodiment, the gas G is air; however, in further embodiments, the gas G may be any other gas G, or combinations of gases G, now known or later developed having a weight that is relatively less than a weight of the liquid L, so long as the apparatus 20 is capable of substantially carrying out the functionality described herein. In at least one alternate embodiment, the at least one control container 24 is not airtight. It should be noted that the at least one control container 24, stationary container 26, first counterbalance container 28, second counterbalance container 30 and support frame 22 depicted in the drawings are merely exemplary and simply shown for illustrative purposes. In further embodiments, the apparatus 20 (along with each of the components described herein—including but not limited to the at least one control container 24, stationary container 26, first counterbalance container 28, second counterbalance container 30 and support frame 22) may take on any other sizes, shapes, dimensions, quantities, configurations and/or arrangements now known or later developed—dependent at least in part on the context in which the apparatus 20 is to be used—so long as the apparatus 20 is capable of substantially carrying out the functionality described herein.

Figure 9:
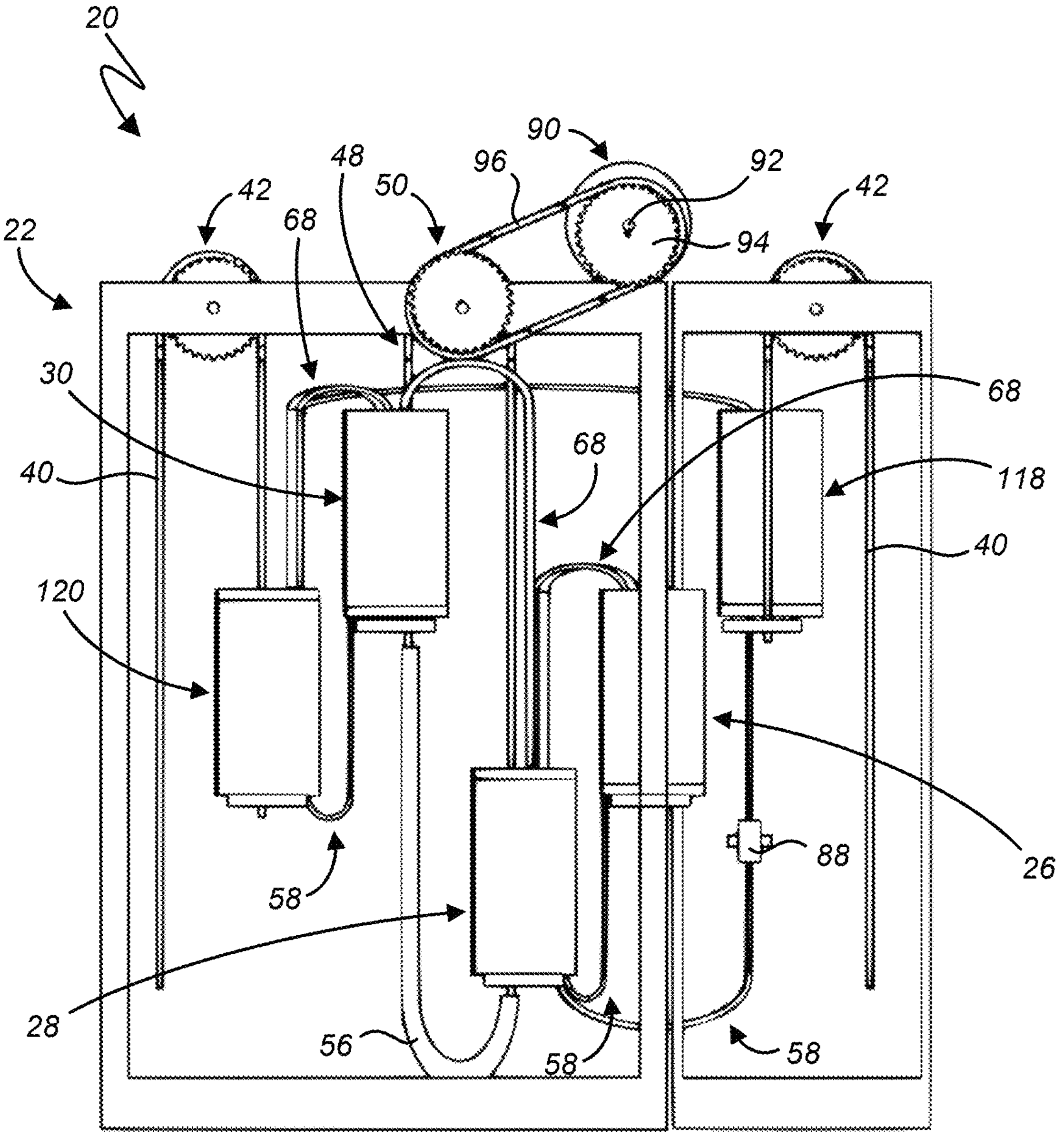
Figure 10:
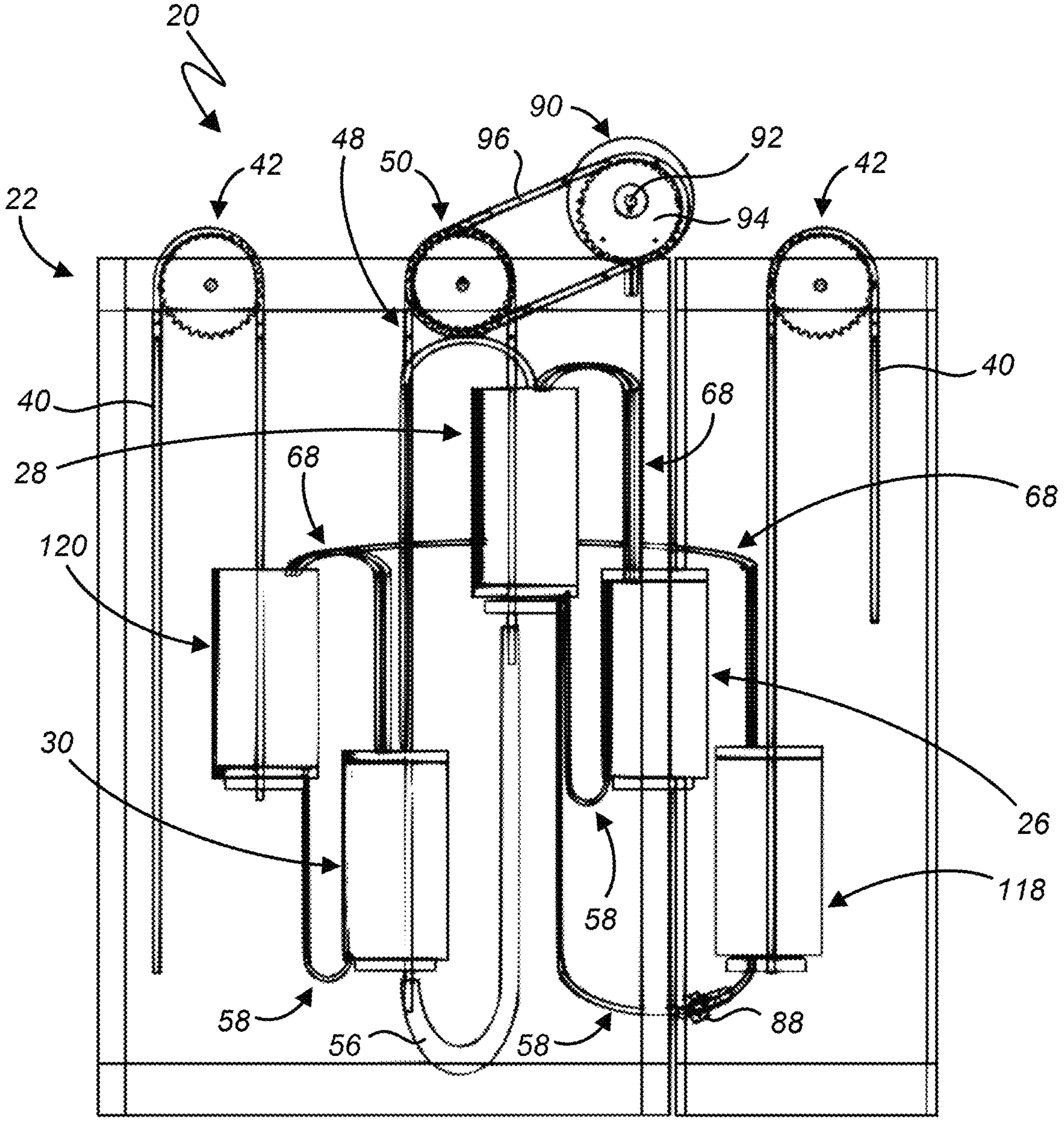

In at least one embodiment, each of the at least one stationary container 26 is fixedly engaged with or otherwise positioned on the support frame 22 so as to have a substantially static vertical position relative to the support frame 22. In at least one such embodiment, the at least one stationary container 26 is positioned on a corresponding at least one stationary platform 32 that is fixedly mounted to the support frame 22. In further embodiments, the at least one stationary container 26 may be fixedly engaged with or otherwise positioned on the support frame 22 using any other structure, mechanism or technique, now known or later developed, capable of allowing the at least one stationary container 26 to have a substantially static vertical position relative to the support frame 22. Additionally, in at least one embodiment, each of the at least one control container 24, first counterbalance container 28 and second counterbalance container 30 is movably engaged with or otherwise positioned on the support frame 22 so as to have a dynamic vertical position relative to the support frame 22. In at least one such embodiment, the at least one control container 24 is positioned on a corresponding at least one control platform 34 that is engaged with the support frame 22 so as to traverse vertically relative to the support frame 22 and selectively move the at least one control container 24 between one of an upper control position (FIGS. 3 and 9)—wherein the at least one control container 24 is positioned proximal to an upper end 36 of the support frame 22—and a lower control position (FIGS. 4 and 10)—wherein the at least one control container 24 is positioned proximal to an opposing lower end 38 of the support frame 22. In at least one embodiment, the at least one control platform 34 is suspended by an at least one control belt 40 (i.e., a belt, chain, strap, rope or any other elongate member, now known or later developed, capable of supporting the at least one control platform 34) from an at least one control pulley 42 that is rotatably mounted to the support frame 22 and capable of raising and lowering the at least one control platform 34 relative to the support frame 22. In further embodiments, the at least one control container 24 may be movably engaged with or otherwise positioned on the support frame 22 using any other structure, mechanism or technique, now known or later developed, capable of allowing the at least one control container 24 to have a dynamic vertical position relative to the support frame 22.

Similarly, in at least one embodiment, each of the at least one first counterbalance container 28 is positioned on a corresponding at least one first counterbalance platform 44 that is engaged with the support frame 22 so as to traverse vertically relative to the support frame 22 and move the at least one first counterbalance container 28 between one of an upper counterbalance position (FIGS. 4 and 10)—wherein the at least one first counterbalance container 28 is positioned proximal to the upper end 36 of the support frame 22—and a lower counterbalance position (FIGS. 3 and 9)—wherein the at least one first counterbalance container 28 is positioned proximal to the lower end 38 of the support frame 22. Additionally, in at least one embodiment, each of the at least one second counterbalance container 30 is positioned on a corresponding at least one second counterbalance platform 46 that is engaged with the support frame 22 so as to traverse vertically relative to the support frame 22 and move the at least one second counterbalance container 30 between one of an upper counterbalance position (FIGS. 4 and 10)—wherein the at least one second counterbalance container 30 is positioned proximal to the upper end 36 of the support frame 22—and a lower counterbalance position (FIGS. 3 and 9)—wherein the at least one second counterbalance container 30 is positioned proximal to the lower end 38 of the support frame 22. In at least one embodiment, each of the at least one first counterbalance platform 44 and second counterbalance platform 46 is suspended by an at least one counterbalance belt 48 (i.e., a belt, chain, strap, rope or any other elongate member, now known or later developed, capable of supporting each of the at least one first counterbalance platform 44 and second counterbalance platform 46) from an at least one counterbalance pulley 50 that is rotatably mounted to the support frame 22 and capable of raising and lowering each of the at least one first counterbalance platform 44 and second counterbalance platform 46 relative to the support frame 22. In at least one embodiment, a first end 52 of the at least one counterbalance belt 48 is engaged with the at least one first counterbalance platform 44, while an opposing second end 54 of the at least one counterbalance belt 48 is engaged with the at least one second counterbalance platform 46. In at least one embodiment, the apparatus 20 further provides an at least one counterweight 56 engaged with and extending between each of the at least one first counterbalance platform 44 and second counterbalance platform 46 (or, alternatively, with each of the first counterbalance container 28 and second counterbalance container 30), the purpose for which is discussed further below. In further embodiments, each of the at least one first counterbalance container 28 and second counterbalance container 30 may be movably engaged with or otherwise positioned on the support frame 22 using any other structure, mechanism or technique, now known or later developed, capable of allowing each of the at least one first counterbalance container 28 and second counterbalance container 30 to have a dynamic vertical position relative to the support frame 22.

In at least one embodiment, as illustrated in FIGS. 2-4, the apparatus 20 includes a single control container 24, a single first counterbalance container 28, a single second counterbalance container 30, and a single stationary container 26. In at least one such embodiment, the control container 24 is in direct fluid communication with the first counterbalance container 28 via a liquid line 58 (i.e., a tube, pipe, hose or any other elongate delivery channel, now known or later developed, capable of facilitating the flow of liquid L), with a first end 60 of the liquid line 58 being positioned proximal to a bottom surface 64 of the control container 24, and an opposing second end 62 of the liquid line 58 being positioned proximal to a bottom surface 66 of the first counterbalance container 28. As discussed further below, the liquid line 58 is positioned and configured for allowing a volume of liquid L to pass between the control container 24 and the first counterbalance container 28 during use of the apparatus 20. In at least one embodiment, the first counterbalance container 28 is in direct fluid communication with the second counterbalance container 30 via a gas line 68 (i.e., a tube, pipe, hose or any other elongate delivery channel, now known or later developed, capable of facilitating the flow of gas G), with a first end 70 of the gas line 68 being positioned proximal to a top surface 74 of the first counterbalance container 28, and an opposing second end 72 of the gas line 68 being positioned proximal to a top surface 76 of the second counterbalance container 30. As discussed further below, the gas line 68 is positioned and configured for allowing a volume of gas G to pass between the first counterbalance container 28 and the second counterbalance container 30 during use of the apparatus 20. In at least one embodiment, the second counterbalance container 30 is in direct fluid communication with the stationary container 26 via another liquid line 58, with a first end 60 of the liquid line 58 being positioned proximal to a bottom surface 78 of the second counterbalance container 30, and an opposing second end 62 of the liquid line 58 being positioned proximal to a bottom surface 80 of the stationary container 26. As discussed further below, the liquid line 58 is positioned and configured for allowing a volume of liquid L to pass between the second counterbalance container 30 and the stationary container 26 during use of the apparatus 20. In at least one embodiment, the stationary container 26 is in direct fluid communication with the control container 24 via another gas line 68, with a first end 70 of the gas line 68 being positioned proximal to a top surface 82 of the stationary container 26, and an opposing second end 72 of the gas line 68 being positioned proximal to a top surface 84 of the control container 24. As discussed further below, the gas line 68 is positioned and configured for allowing a volume of gas G to pass between the stationary container 26 and the control container 24 during use of the apparatus 20.

Figure 8:
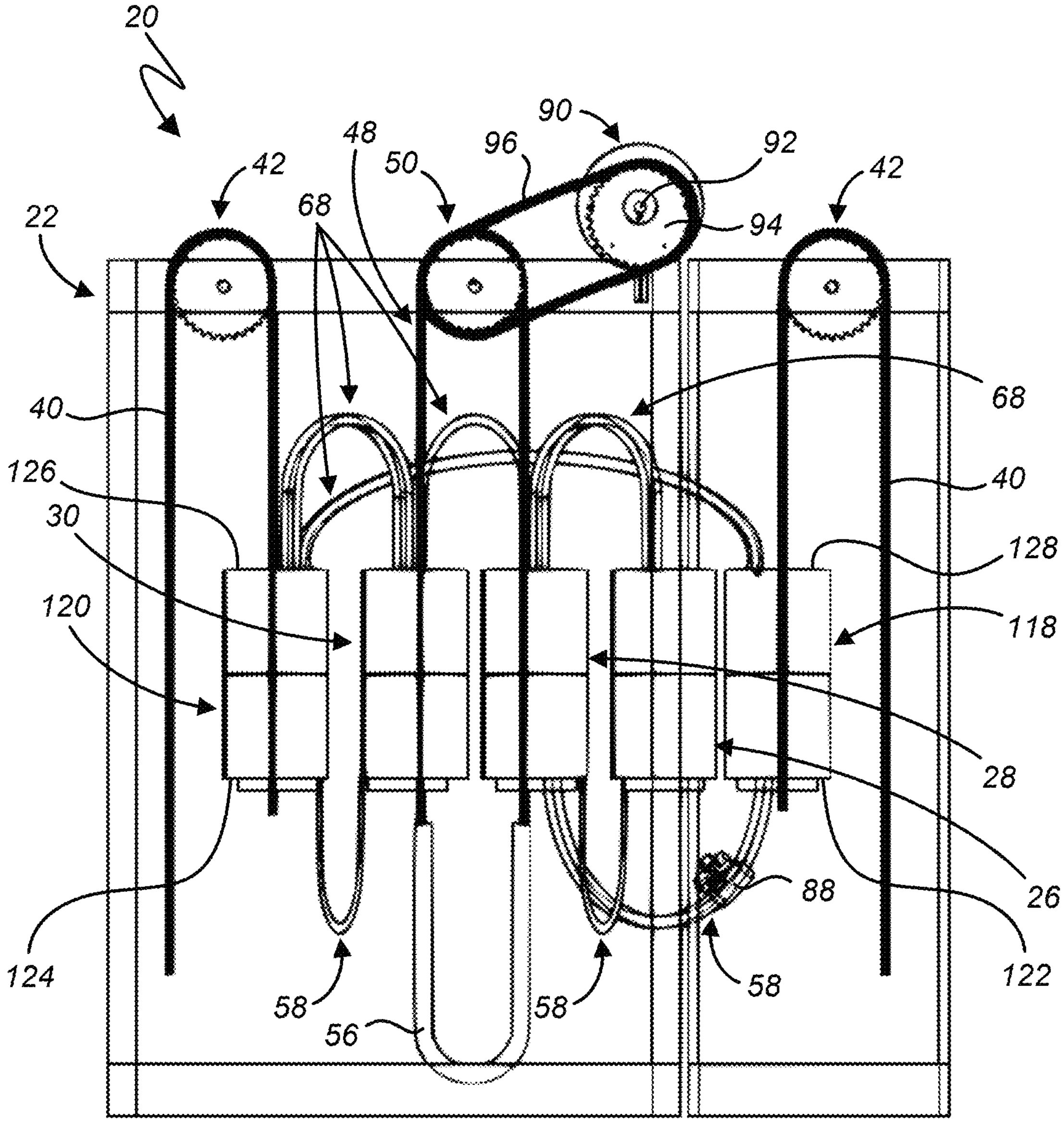
FIGS. 8-10 are side elevational views of the apparatus, in accordance with at least one embodiment.

In at least one embodiment, as illustrated best in FIGS. 2 and 8 (depicting the apparatus 20 in an equilibrium state), a total aggregated volume of liquid L present in the apparatus 20 is approximately equal to one-half of a total aggregated volume capacity of the at least one control container 24, the at least one first counterbalance container 28, the at least one second counterbalance container 30, and the at least one stationary container 26. During use of the apparatus 20, with the at least one control container 24 substantially full of liquid L and moved into the upper control position (FIG. 3) so as to be positioned relatively higher than the at least one stationary container 26, gravity causes the liquid L within the at least one control container 24 to flow through the corresponding liquid line 58 and into the at least one first counterbalance container 28, displacing gas G within the at least one first counterbalance container 28. This displaced gas G then moves through the corresponding gas line 68 and into the at least one second counterbalance container 30, with the resulting gas G pressure pushing liquid L from the at least one second counterbalance container 30 through the corresponding liquid line 58 and into the at least one stationary container 26. This cycle continues until the liquid L level in the at least one stationary container 26 rises to meet the second end 72 of the corresponding gas line 68 (such that the at least one stationary container 26 is substantially full of liquid L), or until the liquid L level in the at least one control container 24 falls below the first end 60 of the corresponding liquid line 58, at which point the pressure difference disappears (i.e., equilibrium within the apparatus 20 is reached). In at least one embodiment, in order to restart the cycle, the at least one control container 24 is moved into the lower control position (FIG. 4) so as to be positioned relatively lower than the at least one stationary container 26, such that gravity causes the liquid L within the at least one stationary container 26 to flow through the corresponding liquid line 58 and into the at least one second counterbalance container 30, displacing gas G within the at least one second counterbalance container 30. This displaced gas G then moves through the corresponding gas line 68 and into the at least one first counterbalance container 28, with the resulting gas G pressure pushing liquid L from the at least one first counterbalance container 28 through the corresponding liquid line 58 and into the at least one control container 24. This cycle continues until the liquid L level in the at least one control container 24 rises to meet the first end 70 of the corresponding gas line 68, or until the liquid L level in the at least one stationary container 26 falls below the second end 62 of the corresponding liquid line 58, at which point the pressure difference disappears (i.e., equilibrium within the apparatus 20 is once again reached).

Figure 7:
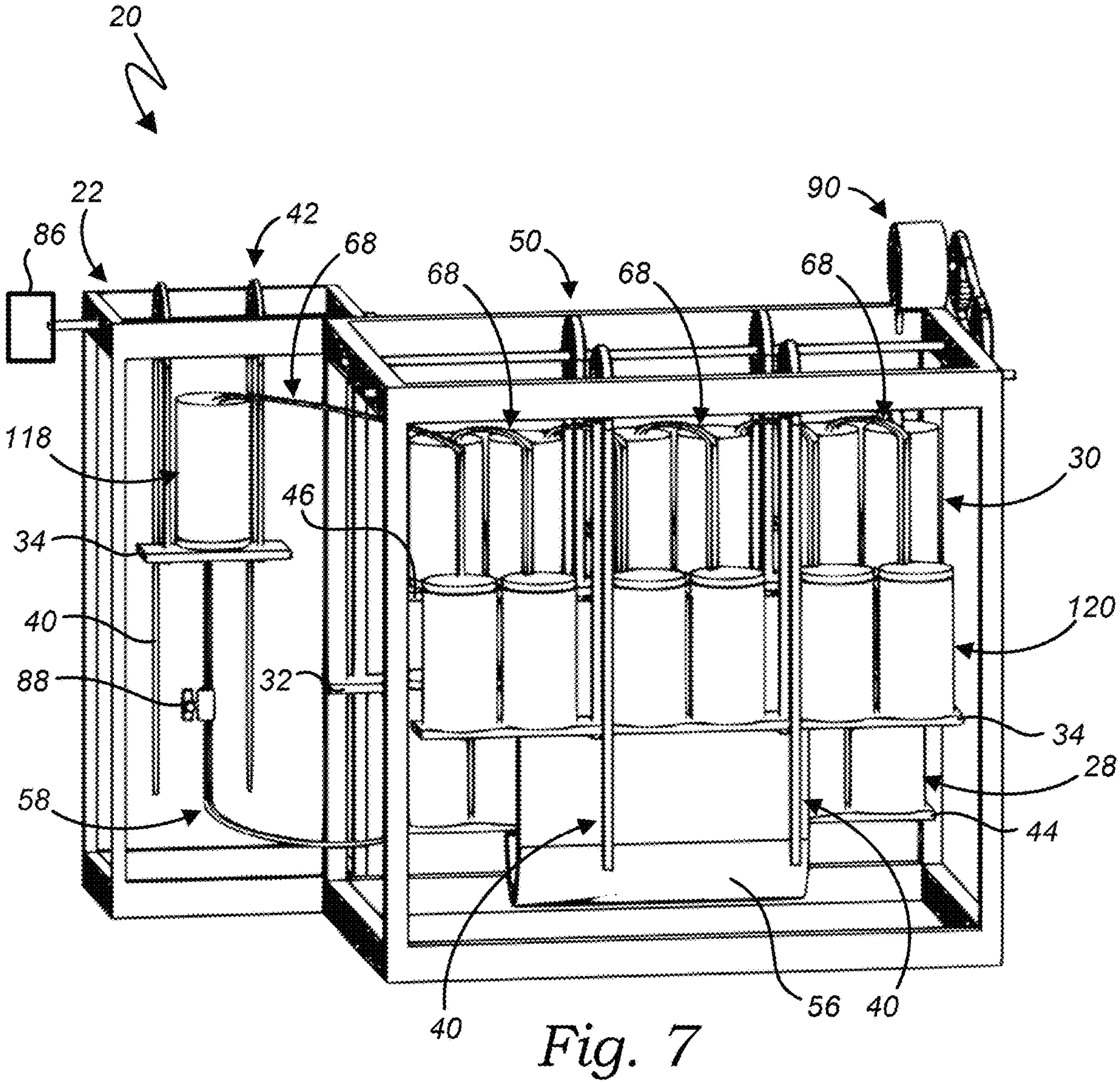
FIG. 7 is a perspective view of a further exemplary hydro-pneumatic apparatus, in accordance with at least one embodiment.

In at least one embodiment, the at least one control container 24 is configured for being manually moved between the upper control position and lower control position as needed—for example, by manually actuating the corresponding at least one control pulley 42 via the at least one control belt 40. In at least one alternate embodiment, the at least one control container 24 is configured for being automatically moved between the upper control position and lower control position as needed. In at least one such alternate embodiment, the at least one control container 24 (inclusive of the at least one control platform 34 on which the at least one control container 24 is positioned and the corresponding at least one control pulley 42) is in mechanical communication with an at least one motor 86 (FIG. 7) configured for automatically moving the at least one control container 24 between the upper control position and lower control position. In at least one such embodiment, the motor 86 may be powered by electricity generated by external clean energy sources, such as solar energy, wind energy, or wave energy, for example. In at least one other alternate embodiment, the at least one control container 24 (inclusive of the at least one control platform 34 on which the at least one control container 24 is positioned and the corresponding at least one control pulley 42) is in mechanical communication with a mechanism configured for automatically moving the at least one control container 24 between the upper control position and lower control position. For example, in at least one such alternate embodiment, external forces such as a passing vehicle rolling over a spring-biased plate in mechanical communication with the at least one control pulley 42, or a buoy rising and falling in a body of water while in mechanical communication with the at least one control pulley 42, could be utilized to automatically move the at least one control container 24 between the upper control position and lower control position.

Additionally, in at least one embodiment, the apparatus 20 provides a control valve 88 positioned in-line between the at least one control container 24 and the corresponding liquid line 58, with the control valve 88 configured for controlling the flow of liquid L from the at least one control container 24 through the corresponding liquid line 58. Thus, in such embodiments, when the at least one control container 24 is in the upper control position, the control valve 88 is capable of selectively starting and stopping the flow of liquid L from the at least one control container 24 as needed, in order to selectively start and stop the apparatus 20. In at least one embodiment, the control valve 88 is manually actuated. In at least one alternate embodiment, the control valve 88 is remotely and/or automatically actuated.

In at least one embodiment, as liquid L flows from the at least one control container 24 while the at least one control container 24 is in the upper control position (with liquid L subsequently flowing into the at least one first counterbalance container 28 and out of the at least one second counterbalance container 30), this movement of liquid L and subsequent change in weights between the at least one first counterbalance container 28 (becoming relatively heavier) and second counterbalance container 30 (becoming relatively lighter) causes the at least one first counterbalance container 28 to move into the lower counterbalance position and the at least one second counterbalance container 30 to move into the upper counterbalance position. Similarly, in at least one embodiment, as liquid L flows from the at least one stationary container 26 while the at least one control container 24 is in the lower control position (with liquid L subsequently flowing into the at least one second counterbalance container 30 and out of the at least one first counterbalance container 28), this movement of liquid L and subsequent change in weights between the at least one first counterbalance container 28 (becoming relatively lighter) and second counterbalance container 30 (becoming relatively heavier) causes the at least one first counterbalance container 28 to move into the upper counterbalance position and the at least one second counterbalance container 30 to move into the lower counterbalance position. In at least one embodiment, where the apparatus 20 further provides the at least one counterweight 56 discussed above, the at least one counterweight 56 assists in urging each of the at least one first counterbalance container 28 and second counterbalance container 30 into their respective lower counterbalance positions. In at least one embodiment, the at least one counterweight 56 has a weight that is relatively less than a weight of either of the at least one first counterbalance container 28 or second counterbalance container 30 when the at least one first counterbalance container 28 or second counterbalance container 30 is full of liquid L, such that each of the at least one first counterbalance container 28 and second counterbalance container 30 is able to overcome the weight of the at least one counterweight 56 when moving into the lower counterbalance position. In at least one embodiment, the at least one counterweight 56 has a weight that is selectively adjustable. In at least one embodiment, the at least one counterweight 56 is flexible. In at least one such embodiment, the at least one counterweight 56 is a chain; however, in further embodiments, the at least one counterweight 56 may be any other structure, mechanism or technique, now known or later developed, capable of urging each of the at least one first counterbalance container 28 and second counterbalance container 30 into their respective lower counterbalance positions.

In at least one embodiment, the apparatus 20 is configured for harnessing the movements of the at least one first counterbalance container 28 and second counterbalance container 30 between their respective upper and lower counterbalance positions so as to produce one or more meaningful outputs. In at least one embodiment, one such meaningful output is the generation of electricity. In at least one such embodiment, the apparatus 20 provides an at least one mechanical generator 90 in mechanical communication with the at least one counterbalance pulley 50 and configured for generating electricity. In at least one embodiment, the at least one mechanical generator 90 provides a generator axle 92 and a generator wheel 94 that is in mechanical communication with the at least one counterbalance pulley 50 (such as via a generator belt 96 or a series of cogs arranged so as to interconnect the generator wheel 94 and the at least one counterbalance pulley 50, for example). Thus, as the at least one first counterbalance container 28 and second counterbalance container 30 move between their respective upper and lower counterbalance positions, the at least one counterbalance pulley 50 rotates which, in turn, rotates the generator wheel 94, causing the mechanical generator 90 to generate electricity. In at least one further embodiment, the at least one mechanical generator 90 may similarly be in mechanical communication with the at least one control pulley 42 so as to generate electricity as the at least one control container 24 moves between its upper and lower control positions.

Figure 5:
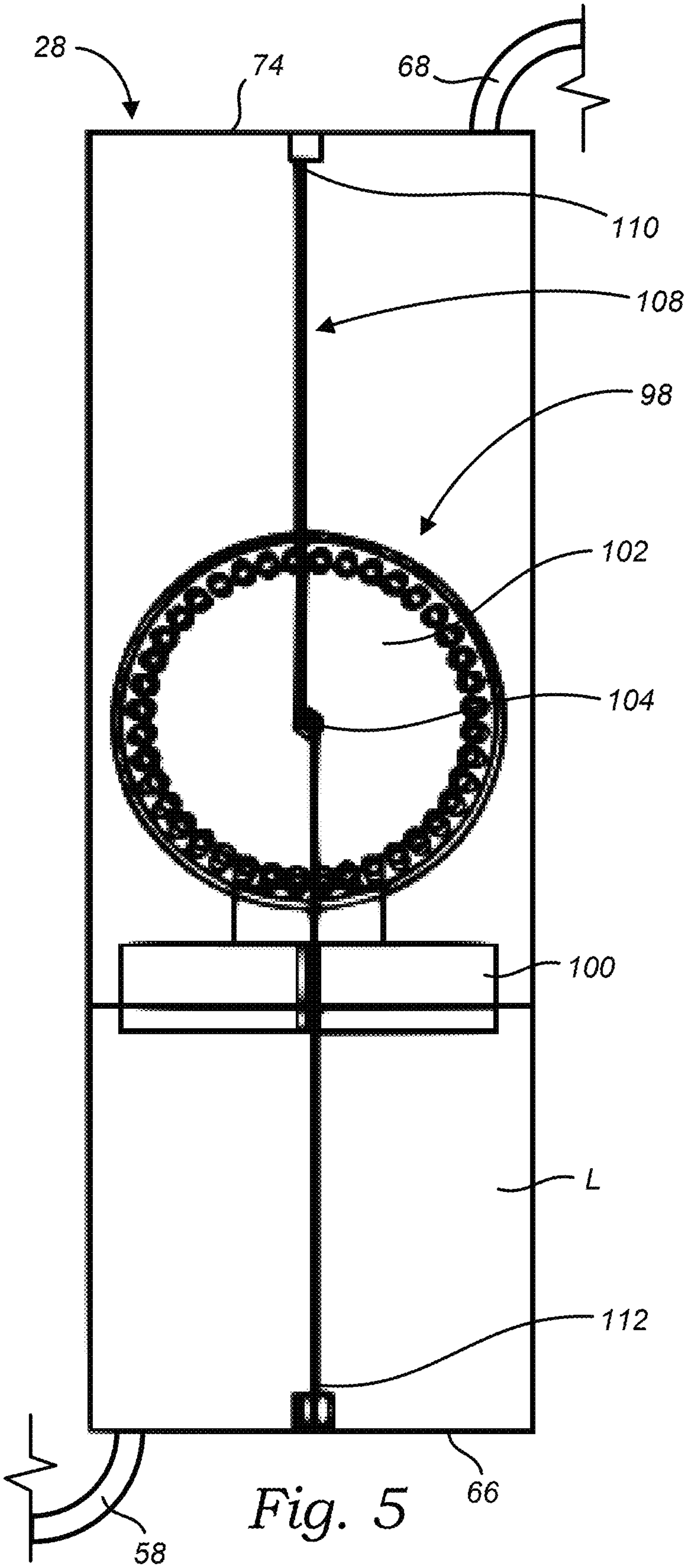
FIGS. 5 and 6 are diagrammatic views of an exemplary buoyancy generator, in accordance with at least one embodiment.
Figure 6:
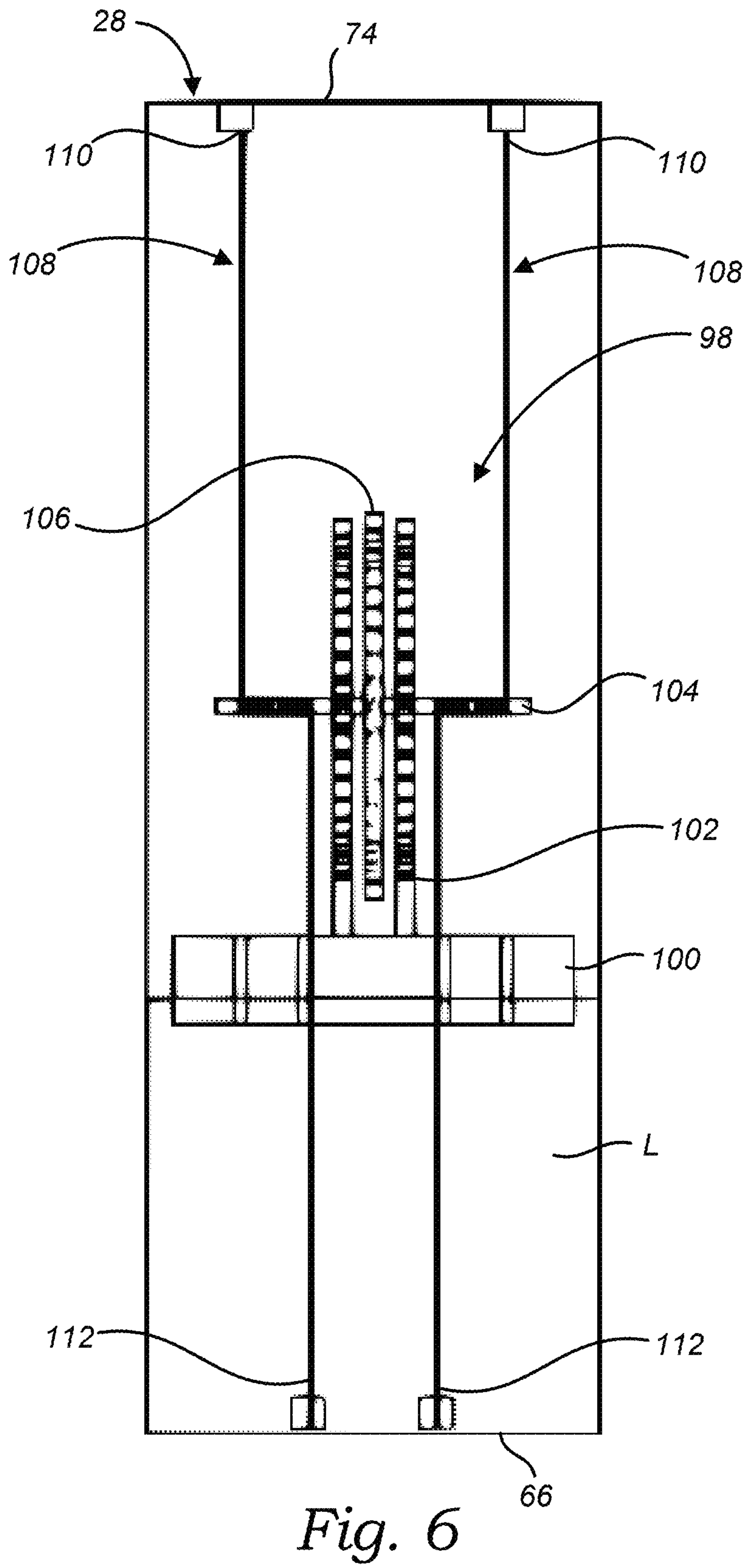

In at least one embodiment, as illustrated in FIGS. 5 and 6, the apparatus 20 provides an at least one buoyancy generator 98 positioned within one or more of the at least one control container 24, stationary container 26, first counterbalance container 28 and second counterbalance container 30 and configured for generating electricity. In at least one such embodiment, the at least one buoyancy generator 98 provides a buoyant generator platform 100 configured for floating on the surface of the liquid L within the corresponding container 24, 26, 28 or 30. A stator 102 is positioned on the generator platform 100, with a substantially horizontally oriented generator shaft 104 extending axially through the stator 102 and a rotor 106 positioned on the generator shaft 104. A pair of generator cables 108 (i.e., cables, wires, strings, or any other elongate pieces of material, now known or later developed, capable of substantially carrying out the functionality described herein) are rotatably engaged with the generator shaft 104 (such as being wound around opposing shaft ends of the generator shaft 104, for example), with a first end 110 of each generator cable 108 being anchored to a top surface of the container 24, 26, 28 or 30, and an opposing second end 112 of each generator cable 108 being anchored to a bottom surface of the container 24, 26, 28 or 30. Accordingly, as the level of liquid L within the container 24, 26, 28 or 30 rises and falls during use of the apparatus 20, the generator platform 100 also rises and falls which, in turn, causes the generator cables 108 to rotate the generator shaft 104 (along with the rotor 106) relative to the stator 102, thereby generating electricity. Thus, in such embodiments, the at least one buoyancy generator 98 is capable of generating electricity on both the upwards and downwards movements of the liquid L level within the corresponding container 24, 26, 28 or 30. In further embodiments, the at least one buoyancy generator 98 (along with each of the components described herein) may take on any other sizes, shapes, dimensions, quantities, configurations and/or arrangements now known or later developed-dependent at least in part on the context in which the apparatus 20 is to be used-so long as the at least one buoyancy generator 98 is capable of substantially carrying out the functionality described herein.

In at least one embodiment, the apparatus 20 provides an at least one liquid turbine 114 (FIG. 2) positioned in-line with one or more of the liquid lines 58 and configured for generating electricity as liquid L moves through the corresponding liquid line 58 during use of the apparatus 20. Similarly, in at least one embodiment, the apparatus 20 provides an at least one gas turbine 116 (FIG. 2) positioned in-line with one or more of the gas lines 68 and configured for generating electricity as gas G moves through the corresponding gas line 68 during use of the apparatus 20. In still further embodiments, the apparatus 20 may incorporate any other structure, mechanism or technique, now known or later developed, capable of harnessing the movements of the apparatus 20 to generate electricity. Thus, in at least one embodiment, the apparatus 20 is capable of harnessing pressures generated, from multiple columns of liquid L combined with multiple columns of gas G, and aggregating those pressures to create a mechanical advantage. This advantage can come in the form of increased liquid L and gas G pressures, the creation of lift force and vacuum force, and the transfer of volumes of liquid L and/or gas G where liquid turbines 114 and/or gas turbines 116 are incorporated.

In at least one embodiment, in order to increase the magnitude of the one or more meaningful outputs produced by the apparatus 20, the apparatus 20 may provide a plurality of control containers 24, first counterbalance containers 28, second counterbalance containers 30, and/or stationary containers 26 connected in series and/or in parallel with one another in order to provide a multiple on the outputs produced by the apparatus 20. In at least one such embodiment, as the volumes of liquid L and gas G move between each of the first counterbalance containers 28, stationary containers 26, and second counterbalance containers 30 in succession, the liquid L and gas G pressures within each of the first counterbalance containers 28, stationary containers 26, and second counterbalance containers 30 are combined with the respective liquid L and gas G pressures within successive first counterbalance containers 28, stationary containers 26, and second counterbalance containers 30, thereby resulting in relatively greater liquid L and gas G pressures in the aggregate and, in turn, greater magnitude outputs.

Figure 11:
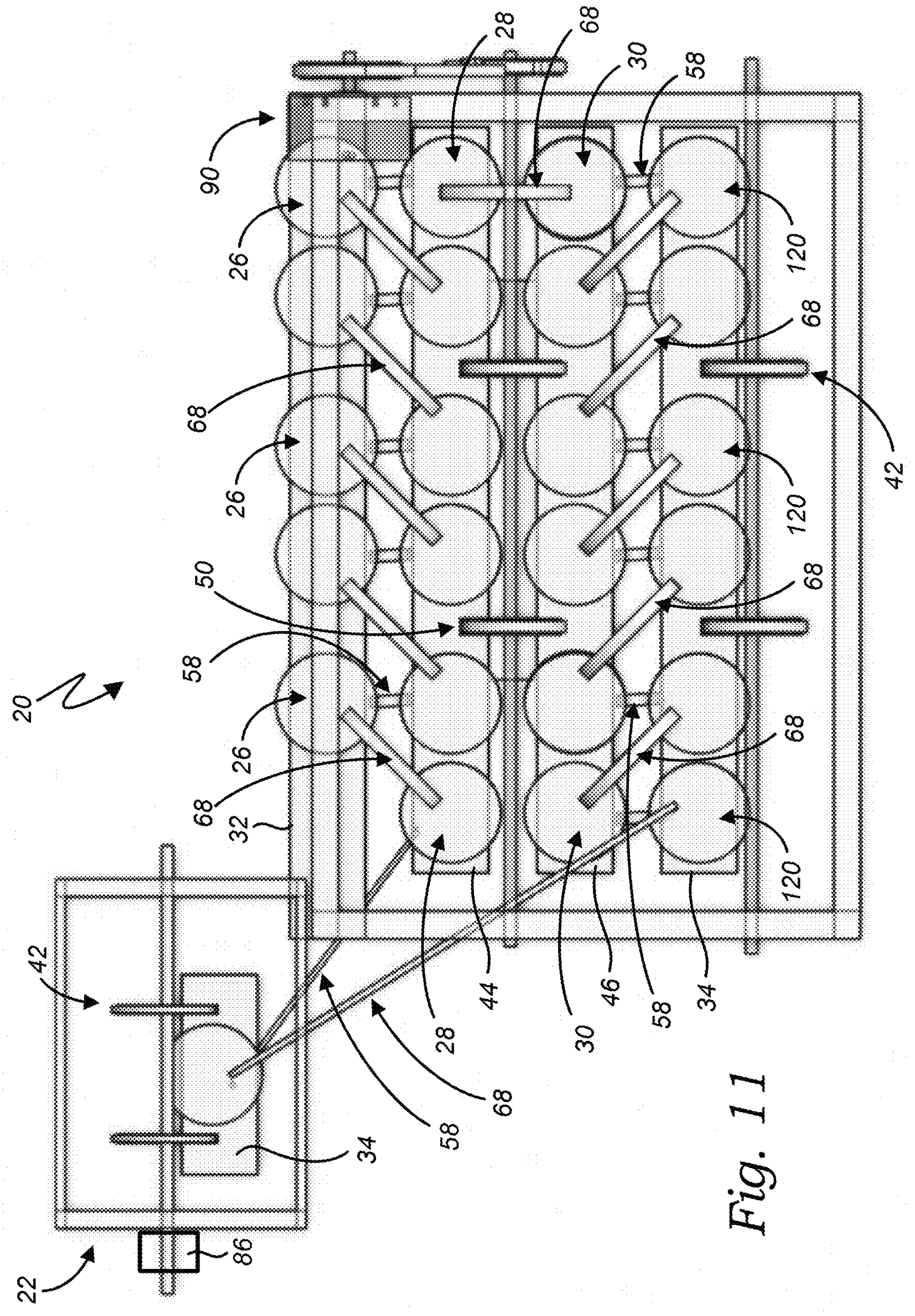
FIG. 11 is a top plan view of the apparatus, in accordance with at least one embodiment.

In at least one such embodiment, as illustrated in FIGS. 7-11, the apparatus 20 provides a first control container 118, a plurality of first counterbalance containers 28, a plurality of second counterbalance containers 30, a plurality of stationary containers 26, and an at least one second control container 120 connected in series with one another. In at least one embodiment, as best illustrated in FIG. 11, the apparatus 20 provides an equal quantity of first counterbalance containers 28 and second counterbalance containers 30 (six of each of the first counterbalance containers 28 and second counterbalance containers 30 in the embodiment depicted in FIGS. 7-11). Additionally, in at least one embodiment, the apparatus 20 provides a quantity of second control containers 120 that is equal to the quantity of the first counterbalance containers 28 or second counterbalance containers 30. However, in at least one alternate embodiment, the apparatus 20 may provide a single second control container 120, or may omit the second control container 120 altogether. Additionally, in at least one embodiment, the apparatus 20 provides a quantity of stationary containers 26 that is equal to one less than the quantity of the first counterbalance containers 28 or second counterbalance containers 30. However, in at least one alternate embodiment, the apparatus 20 may provide a different quantity of stationary containers 26 relative to the quantity of each of the first counterbalance containers 28 and second counterbalance containers 30.

In at least one embodiment, with continued reference to FIG. 11 (along with FIG. 8), the first control container 118 is in direct fluid communication with a first one of the first counterbalance containers 28 via a liquid line 58—with a first end 60 of the liquid line 58 being positioned proximal to a bottom surface 122 of the first control container 118, and an opposing second end 62 of the liquid line 58 being positioned proximal to a bottom surface 66 of the first one of the first counterbalance containers 28—and the first one of the first counterbalance containers 28 is in direct fluid communication with a first one of the stationary containers 26 via a gas line 68—with a first end 70 of the gas line 68 being positioned proximal to a top surface 74 of the first one of the first counterbalance containers 28, and an opposing second end 72 of the gas line 68 being positioned proximal to a top surface 82 of the first one of the stationary containers 26. The remaining ones of the first counterbalance containers 28 and stationary containers 26 are thereafter interconnected in series in an alternating arrangement, such that further liquid lines 58 extend between and interconnect further ones of the remaining stationary containers 26 and first counterbalance containers 28 proximal to a bottom surface 80 and 66 of each of said remaining stationary containers 26 and first counterbalance containers 28, while further gas lines 68 extend between and interconnect further ones of the remaining first counterbalance containers 28 and stationary containers 26 proximal to a top surface 74 and 82 of each of said remaining first counterbalance containers 28 and stationary containers 26. Additionally, in at least one embodiment, a last one of the first counterbalance containers 28 is in direct fluid communication with a first one of the second counterbalance containers 30 via a gas line 68—with a first end 70 of the gas line 68 being positioned proximal to a top surface 74 of the last one of the first counterbalance containers 28, and an opposing second end 72 of the gas line 68 being positioned proximal to a top surface 76 of the first one of the second counterbalance containers 30—and the first one of the second counterbalance containers 30 is in direct fluid communication with a first one of the second control containers 120 via a liquid line 58—with a first end 60 of the liquid line 58 being positioned proximal to a bottom surface 78 of the first one of the second counterbalance containers 30, and an opposing second end 62 of the liquid line 58 being positioned proximal to a bottom surface 124 of the first one of the second control containers 120. The remaining ones of the second counterbalance containers 30 and second control containers 120 are thereafter interconnected in series in an alternating arrangement, such that further gas lines 68 extend between and interconnect further ones of the remaining second control containers 120 and second counterbalance containers 30 proximal to a top surface 126 and 76 of each of said remaining second control containers 120 and second counterbalance containers 30, while further liquid lines 58 extend between and interconnect further ones of the remaining second counterbalance containers 30 and second control containers 120 proximal to a bottom surface 78 and 124 of each of said remaining second counterbalance containers 30 and second control containers 120. In at least one embodiment, a last one of the second control containers 120 is in direct fluid communication with the first control container 118 via a gas line 68—with a first end 70 of the gas line 68 being positioned proximal to a top surface 126 of the last one of the second control containers 120, and an opposing second end 72 of the gas line 68 being positioned proximal to a top surface 128 of the first control container 118—thereby forming a closed loop through each of the first control container 118, first counterbalance containers 28, stationary containers 26, second counterbalance containers 30 and second control containers 120 connected in series with one another. In further embodiments, each of the first control container 118, the first counterbalance containers 28, the second counterbalance containers 30, the stationary containers 26, and the at least one second control container 120 may be interconnected in different arrangements, so long as the apparatus 20 is capable of substantially carrying out the functionality described herein.

In each such embodiment, during use of the apparatus 20, with the first control container 118 substantially full of liquid L and moved into the upper control position (FIG. 9) so as to be positioned relatively higher than the secondary control containers 120, gravity causes the liquid L within the first control container 118 to flow through the corresponding liquid line 58 and into the first one of the first counterbalance containers 28, displacing gas G within the first one of the first counterbalance containers 28. This displaced gas G then moves through the corresponding gas line 68 and into the subsequent one of the stationary containers 26, with the resulting gas G pressure pushing liquid L from said subsequent one of the stationary containers 26 through the corresponding liquid line 58 and into the subsequent one of the first counterbalance containers 28. This cycle continues through each of the first counterbalance containers 28, stationary containers 26, second counterbalance containers 30 and second control containers 120 until the liquid L level in each of the stationary containers 26 rises to meet the second end 72 of the corresponding gas line 68 (such that each of the stationary containers 26 is substantially full of liquid L), or until the liquid L level in the first control container 118 falls below the first end 60 of the corresponding liquid line 58, at which point the cycle is complete. In at least one embodiment, in order to start the cycle and flow of fluids in the opposite direction, the first control container 118 is moved into the lower control position (FIG. 10) so as to be positioned relatively lower than the stationary containers 26, such that gravity causes the liquid L within the last one of the second control containers 120 to flow through the corresponding liquid line 58 and into a last one of the second counterbalance containers 30, displacing gas G within the last one of the second counterbalance containers 30. This displaced gas G then moves through the corresponding gas line 68 and into the subsequent one of the second control containers 120, with the resulting gas G pressure pushing liquid L from said subsequent one of the second control containers 120 through the corresponding liquid line 58 and into the subsequent one of the second counterbalance containers 30. This cycle continues through each of the second counterbalance containers 30, second control containers 120, first counterbalance containers 28, stationary containers 26, and the first control container 118 until the liquid L level in the first control container 118 rises to meet the second end 72 of the corresponding gas line 68 (such that the first control container 118 is substantially full of liquid L), or until the liquid L level in each of the second control containers 120 falls below the first end 60 of the corresponding liquid line 58, at which point the cycle is complete. These two cycles may be repeated as many times as desired.

As noted above, the at least one control container 24, stationary container 26, first counterbalance container 28, second counterbalance container 30 and support frame 22 depicted in the drawings are merely exemplary and simply shown for illustrative purposes. In further embodiments, the apparatus 20 (along with each of the components described herein—including but not limited to the at least one control container 24, stationary container 26, first counterbalance container 28, second counterbalance container 30 and support frame 22) may take on any other sizes, shapes, dimensions, quantities, configurations and/or arrangements now known or later developed—dependent at least in part on the context in which the apparatus 20 is to be used—so long as the apparatus 20 is capable of substantially carrying out the functionality described herein. Thus, in further embodiments, the apparatus 20 can be scaled up or down—in the quantities of control containers 24, stationary containers 26, first counterbalance containers 28, and second counterbalance containers 30, in addition to the respective heights of each of the control containers 24, stationary containers 26, first counterbalance containers 28, and second counterbalance containers 30 relative to the support frame 22 and one another, as well as the respective volumes of each of the control containers 24, stationary containers 26, first counterbalance containers 28, and second counterbalance containers 30, along with the relative densities of the liquid(s) L and gas(es) G used—in order to achieve the desired outputs to be produced by the apparatus 20.

Thus, in at least one embodiment, the apparatus 20 utilizes both liquids L and gases G arranged within a single fluid system that takes the best of both hydraulics and pneumatics and merges them into a single solution capable of storing and using clean energy derived from hydro-pneumatic fluid displacement.

Aspects of the present specification may also be described as the following embodiments:

1. A hydro-pneumatic apparatus configured for storing and using clean energy derived from hydro-pneumatic fluid displacement, the apparatus comprising: an at least one support frame configured for supporting an at least one control container, an at least one stationary container, an at least one first counterbalance container, and an at least one second counterbalance container connected in series with one another; each of the at least one control container, stationary container, first counterbalance container and second counterbalance container being airtight and configured for containing one or both of a volume of a liquid and a volume of a gas; each of the at least one stationary container fixedly engaged with or otherwise positioned on the support frame so as to have a substantially static vertical position relative to the support frame; each of the at least one control container, first counterbalance container and second counterbalance container movably engaged with or otherwise positioned on the support frame so as to have a dynamic vertical position relative to the support frame; the at least one control container configured for moving between one of an upper control position—wherein the at least one control container is positioned proximal to an upper end of the support frame—and a lower control position—wherein the at least one control container is positioned proximal to an opposing lower end of the support frame; the at least one first counterbalance container configured for moving between one of an upper counterbalance position—wherein the at least one first counterbalance container is positioned proximal to the upper end of the support frame—and a lower counterbalance position—wherein the at least one first counterbalance container is positioned proximal to the lower end of the support frame; the at least one second counterbalance container configured for moving between one of an upper counterbalance position—wherein the at least one second counterbalance container is positioned proximal to the upper end of the support frame—and a lower counterbalance position—wherein the at least one second counterbalance container is positioned proximal to the lower end of the support frame; a first one of the at least one control container in direct fluid communication with a first one of the at least one first counterbalance container via a liquid line positioned and configured for allowing a volume of liquid to pass between said control container and said first counterbalance container during use of the apparatus, a first end of the liquid line positioned proximal to a bottom surface of said control container, and an opposing second end of the liquid line positioned proximal to a bottom surface of said first counterbalance container; the first one of the at least one first counterbalance container further in direct fluid communication with a first one of the at least one second counterbalance container via a gas line positioned and configured for allowing a volume of gas to pass between said first counterbalance container and said second counterbalance container during use of the apparatus, a first end of the gas line positioned proximal to a top surface of said first counterbalance container, and an opposing second end of the gas line positioned proximal to a top surface of said second counterbalance container; the first one of the at least one second counterbalance container further in direct fluid communication with a first one of the at least one stationary container via a liquid line positioned and configured for allowing a volume of liquid to pass between said second counterbalance container and said stationary container during use of the apparatus, a first end of the liquid line positioned proximal to a bottom surface of said second counterbalance container, and an opposing second end of the liquid line positioned proximal to a bottom surface of said stationary container; and the first one of the at least one stationary container further in direct fluid communication with the first one of the at least one control container via a gas line positioned and configured for allowing a volume of gas to pass between said stationary container and said control container during use of the apparatus, a first end of the gas line positioned proximal to a top surface of said stationary container, and an opposing second end of the gas line positioned proximal to a top surface of said control container.

2. The hydro-pneumatic apparatus according to embodiment 1, wherein the liquid is water.

3. The hydro-pneumatic apparatus according to embodiments 1-2, wherein the gas is air.

4. The hydro-pneumatic apparatus according to embodiments 1-3, wherein the at least one stationary container is positioned on a corresponding at least one stationary platform that is fixedly mounted to the support frame.

5. The hydro-pneumatic apparatus according to embodiments 1-4, wherein the at least one control container is positioned on a corresponding at least one control platform that is engaged with the support frame so as to traverse vertically relative to the support frame and selectively move the at least one control container between the upper control position and the lower control position.

6. The hydro-pneumatic apparatus according to embodiments 1-5, wherein the at least one control platform is suspended by an at least one control belt from an at least one control pulley that is rotatably mounted to the support frame and capable of raising and lowering the at least one control platform relative to the support frame.

7. The hydro-pneumatic apparatus according to embodiments 1-6, wherein the at least one control container is in mechanical communication with an at least one motor configured for automatically moving the at least one control container between the upper control position and the lower control position.

8. The hydro-pneumatic apparatus according to embodiments 1-7, further comprising an at least one mechanical generator in mechanical communication with the at least one control pulley and configured for generating electricity.

9. The hydro-pneumatic apparatus according to embodiments 1-8, wherein the at least one mechanical generator provides a generator axle and a generator wheel in mechanical communication with the at least one control pulley, whereby, as the at least one first control container moves between the upper and lower control positions, the at least one control pulley rotates which, in turn, rotates the generator wheel, causing the mechanical generator to generate electricity.

10. The hydro-pneumatic apparatus according to embodiments 1-9, wherein the at least one first counterbalance container is positioned on a corresponding at least one first counterbalance platform that is engaged with the support frame so as to traverse vertically relative to the support frame and move the at least one first counterbalance container between the upper counterbalance position and the lower counterbalance position.

11. The hydro-pneumatic apparatus according to embodiments 1-10, wherein the at least one first counterbalance platform is suspended by an at least one counterbalance belt from an at least one counterbalance pulley that is rotatably mounted to the support frame and capable of raising and lowering the at least one first counterbalance platform relative to the support frame.

12. The hydro-pneumatic apparatus according to embodiments 1-11, wherein the at least one second counterbalance container is positioned on a corresponding at least one second counterbalance platform that is engaged with the support frame so as to traverse vertically relative to the support frame and move the at least one second counterbalance container between the upper counterbalance position and the lower counterbalance position.

13. The hydro-pneumatic apparatus according to embodiments 1-12, wherein the at least one second counterbalance platform is suspended by an at least one counterbalance belt from an at least one counterbalance pulley that is rotatably mounted to the support frame and capable of raising and lowering the at least one second counterbalance platform relative to the support frame.

14. The hydro-pneumatic apparatus according to embodiments 1-13, wherein: a first end of the at least one counterbalance belt is engaged with the at least one first counterbalance platform; and an opposing second end of the at least one counterbalance belt is engaged with the at least one second counterbalance platform.

15. The hydro-pneumatic apparatus according to embodiments 1-14, wherein the apparatus further provides an at least one counterweight engaged with and extending between each of the at least one first counterbalance platform and second counterbalance platform, the at least one counterweight configured for assisting in urging each of the at least one first counterbalance container and second counterbalance container into their respective lower counterbalance positions.

16. The hydro-pneumatic apparatus according to embodiments 1-15, wherein the at least one counterweight has a weight that is relatively less than a weight of either of the at least one first counterbalance container or second counterbalance container when the at least one first counterbalance container or second counterbalance container is full of liquid, such that each of the at least one first counterbalance container and second counterbalance container is able to overcome the weight of the at least one counterweight when moving into the lower counterbalance position.

17. The hydro-pneumatic apparatus according to embodiments 1-16, wherein the at least one counterweight is a chain.

18. The hydro-pneumatic apparatus according to embodiments 1-17, further comprising an at least one mechanical generator in mechanical communication with the at least one counterbalance pulley and configured for generating electricity.

19. The hydro-pneumatic apparatus according to embodiments 1-18, wherein the at least one mechanical generator provides a generator axle and a generator wheel in mechanical communication with the at least one counterbalance pulley, whereby, as the at least one first counterbalance container and second counterbalance move between their respective upper and lower counterbalance positions, the at least one counterbalance pulley rotates which, in turn, rotates the generator wheel, causing the mechanical generator to generate electricity.

20. The hydro-pneumatic apparatus according to embodiments 1-19, wherein a total aggregated volume of liquid present in the apparatus is approximately equal to one-half of a total aggregated volume capacity of the at least one control container, the at least one first counterbalance container, the at least one second counterbalance container, and the at least one stationary container.

21. The hydro-pneumatic apparatus according to embodiments 1-20, further comprising a control valve positioned in-line between the at least one control container and the corresponding liquid line, the control valve configured for controlling the flow of liquid from the at least one control container through the corresponding liquid line.

22. The hydro-pneumatic apparatus according to embodiments 1-21, further comprising an at least one buoyancy generator positioned within one or more of the at least one control container, stationary container, first counterbalance container and second counterbalance container and configured for generating electricity, the at least one buoyancy generator comprising: a buoyant generator platform configured for floating on a surface of liquid within the corresponding container; a stator positioned on the generator platform; a substantially horizontally oriented generator shaft extending axially through the stator; a rotor positioned on the generator shaft; and a pair of generator cables rotatably engaged with the generator shaft, a first end of each generator cable anchored to a top surface of the container, and an opposing second end of each generator cable anchored to a bottom surface of the container; whereby, as a level of liquid within the container rises and falls during use of the apparatus, the generator platform also rises and falls which, in turn, causes the generator cables to rotate the generator shaft relative to the stator, thereby generating electricity.

23. The hydro-pneumatic apparatus according to embodiments 1-22, further comprising an at least one liquid turbine positioned in-line with one or more of the liquid lines and configured for generating electricity as liquid moves through the corresponding liquid line during use of the apparatus.

24. The hydro-pneumatic apparatus according to embodiments 1-23, further comprising an at least one gas turbine positioned in-line with one or more of the gas lines and configured for generating electricity as gas moves through the corresponding gas line during use of the apparatus.

25. The hydro-pneumatic apparatus according to embodiments 1-24, wherein the apparatus comprises a first control container, a plurality of first counterbalance containers, a plurality of second counterbalance containers, a plurality of stationary containers, and an at least one second control container connected in series with one another.

26. The hydro-pneumatic apparatus according to embodiments 1-25, wherein: the apparatus provides an equal quantity of first counterbalance containers and second counterbalance containers; the apparatus provides a quantity of second control containers that is equal to the quantity of the first counterbalance containers or second counterbalance containers; and the apparatus provides a quantity of stationary containers that is equal to one less than the quantity of the first counterbalance containers or second counterbalance containers.

27. A hydro-pneumatic apparatus configured for storing and using clean energy derived from hydro-pneumatic fluid displacement, the apparatus comprising: an at least one support frame configured for supporting an at least one control container, an at least one stationary container, an at least one first counterbalance container, and an at least one second counterbalance container connected in series with one another; each of the at least one control container, stationary container, first counterbalance container and second counterbalance container being airtight and configured for containing one or both of a volume of a liquid and a volume of a gas; each of the at least one stationary container fixedly engaged with or otherwise positioned on the support frame so as to have a substantially static vertical position relative to the support frame; each of the at least one control container, first counterbalance container and second counterbalance container movably engaged with or otherwise positioned on the support frame so as to have a dynamic vertical position relative to the support frame; the at least one control container configured for moving between one of an upper control position—wherein the at least one control container is positioned proximal to an upper end of the support frame—and a lower control position—wherein the at least one control container is positioned proximal to an opposing lower end of the support frame; the at least one first counterbalance container configured for moving between one of an upper counterbalance position—wherein the at least one first counterbalance container is positioned proximal to the upper end of the support frame—and a lower counterbalance position—wherein the at least one first counterbalance container is positioned proximal to the lower end of the support frame; the at least one second counterbalance container configured for moving between one of an upper counterbalance position—wherein the at least one second counterbalance container is positioned proximal to the upper end of the support frame—and a lower counterbalance position—wherein the at least one second counterbalance container is positioned proximal to the lower end of the support frame; a first one of the at least one control container in direct fluid communication with a first one of the at least one first counterbalance container via a liquid line positioned and configured for allowing a volume of liquid to pass between said control container and said first counterbalance container during use of the apparatus, a first end of the liquid line positioned proximal to a bottom surface of said control container, and an opposing second end of the liquid line positioned proximal to a bottom surface of said first counterbalance container; the first one of the at least one first counterbalance container further in direct fluid communication with a first one of the at least one second counterbalance container via a gas line positioned and configured for allowing a volume of gas to pass between said first counterbalance container and said second counterbalance container during use of the apparatus, a first end of the gas line positioned proximal to a top surface of said first counterbalance container, and an opposing second end of the gas line positioned proximal to a top surface of said second counterbalance container; the first one of the at least one second counterbalance container further in direct fluid communication with a first one of the at least one stationary container via a liquid line positioned and configured for allowing a volume of liquid to pass between said second counterbalance container and said stationary container during use of the apparatus, a first end of the liquid line positioned proximal to a bottom surface of said second counterbalance container, and an opposing second end of the liquid line positioned proximal to a bottom surface of said stationary container; the first one of the at least one stationary container further in direct fluid communication with the first one of the at least one control container via a gas line positioned and configured for allowing a volume of gas to pass between said stationary container and said control container during use of the apparatus, a first end of the gas line positioned proximal to a top surface of said stationary container, and an opposing second end of the gas line positioned proximal to a top surface of said control container; and an at least one buoyancy generator positioned within one or more of the at least one control container, stationary container, first counterbalance container and second counterbalance container and configured for generating electricity, the at least one buoyancy generator comprising: a buoyant generator platform configured for floating on a surface of liquid within the corresponding container; a stator positioned on the generator platform; a substantially horizontally oriented generator shaft extending axially through the stator; a rotor positioned on the generator shaft; and a pair of generator cables rotatably engaged with the generator shaft, a first end of each generator cable anchored to a top surface of the container, and an opposing second end of each generator cable anchored to a bottom surface of the container; whereby, as a level of liquid within the container rises and falls during use of the apparatus, the generator platform also rises and falls which, in turn, causes the generator cables to rotate the generator shaft relative to the stator, thereby generating electricity.

28. A hydro-pneumatic apparatus configured for storing and using clean energy derived from hydro-pneumatic fluid displacement, the apparatus comprising: an at least one support frame configured for supporting a first control container, a plurality of stationary containers, a plurality of first counterbalance containers, a plurality of second counterbalance containers, and a plurality of second control containers connected in series with one another; each of the first control container, stationary containers, first counterbalance containers, second counterbalance containers, and second control containers being airtight and configured for containing one or both of a volume of a liquid and a volume of a gas; each of the stationary containers fixedly engaged with or otherwise positioned on the support frame so as to have a substantially static vertical position relative to the support frame; each of the first control container, first counterbalance containers, second counterbalance containers, and second control containers movably engaged with or otherwise positioned on the support frame so as to have a dynamic vertical position relative to the support frame; the first control container configured for moving between one of an upper control position—wherein the first control container is positioned proximal to an upper end of the support frame—and a lower control position—wherein the first control container is positioned proximal to an opposing lower end of the support frame; the first counterbalance containers configured for moving between one of an upper counterbalance position—wherein the first counterbalance containers are positioned proximal to the upper end of the support frame—and a lower counterbalance position—wherein the first counterbalance containers are positioned proximal to the lower end of the support frame; the second counterbalance containers configured for moving between one of an upper counterbalance position—wherein the second counterbalance containers are positioned proximal to the upper end of the support frame—and a lower counterbalance position—wherein the second counterbalance containers are positioned proximal to the lower end of the support frame; the second control containers configured for moving between one of an upper control position—wherein the second control containers are positioned proximal to the upper end of the support frame—and a lower control position—wherein the second control containers are positioned proximal to the lower end of the support frame; the first control container in direct fluid communication with a first one of the first counterbalance containers via a liquid line positioned and configured for allowing a volume of liquid to pass between the first control container and said first counterbalance container during use of the apparatus, a first end of the liquid line positioned proximal to a bottom surface of the first control container, and an opposing second end of the liquid line positioned proximal to a bottom surface of said first counterbalance container; the first one of the first counterbalance containers further in direct fluid communication with a first one of the stationary containers via a gas line positioned and configured for allowing a volume of gas to pass between said first counterbalance container and said stationary container during use of the apparatus, a first end of the gas line positioned proximal to a top surface of said first counterbalance container, and an opposing second end of the gas line positioned proximal to a top surface of said stationary container; the first one of the stationary containers further in direct fluid communication with a further one of the first counterbalance containers via a liquid line positioned and configured for allowing a volume of liquid to pass between said stationary container and said first counterbalance container during use of the apparatus, a first end of the liquid line positioned proximal to a bottom surface of said stationary container, and an opposing second end of the liquid line positioned proximal to a bottom surface of said first counterbalance container; remaining ones of the first counterbalance containers and stationary containers thereafter interconnected in series in an alternating arrangement, such that further liquid lines extend between and interconnect further ones of the remaining stationary containers and first counterbalance containers proximal to a bottom surface of each of said remaining stationary containers and first counterbalance containers, while further gas lines extend between and interconnect further ones of the remaining first counterbalance containers and stationary containers proximal to a top surface of each of said remaining first counterbalance containers and stationary containers; a last one of the first counterbalance containers further in direct fluid communication with a first one of the second counterbalance containers via a gas line positioned and configured for allowing a volume of gas to pass between said first counterbalance container and said second counterbalance container during use of the apparatus, a first end of the gas line positioned proximal to a top surface of said first counterbalance container, and an opposing second end of the gas line positioned proximal to a top surface of said second counterbalance container; the first one of the second counterbalance containers further in direct fluid communication with a first one of the second control containers via a liquid line positioned and configured for allowing a volume of liquid to pass between said second counterbalance container and said second control container during use of the apparatus, a first end of the liquid line positioned proximal to a bottom surface of said second counterbalance container, and an opposing second end of the liquid line positioned proximal to a bottom surface of said second control container; the first one of the second control containers further in direct fluid communication with a further one of the second counterbalance containers via a gas line positioned and configured for allowing a volume of gas to pass between said second control container and said second counterbalance container during use of the apparatus, a first end of the gas line positioned proximal to a top surface of said second control container, and an opposing second end of the gas line positioned proximal to a top surface of said second counterbalance container; remaining ones of the second counterbalance containers and second control containers thereafter interconnected in series in an alternating arrangement, such that further gas lines extend between and interconnect further ones of the remaining second control containers and second counterbalance containers proximal to a top surface of each of said remaining second control containers and second counterbalance containers, while further liquid lines extend between and interconnect further ones of the remaining second counterbalance containers and second control containers proximal to a bottom surface of each of said remaining second counterbalance containers and second control containers; and a last one of the second control containers further in direct fluid communication with the first control container via a gas line positioned and configured for allowing a volume of gas to pass between said second control container and the first control container during use of the apparatus, a first end of the gas line positioned proximal to a top surface of said second control container, and an opposing second end of the gas line positioned proximal to a top surface of the first control container.

In closing, regarding the exemplary embodiments of the present invention as shown and described herein, it will be appreciated that a hydro-pneumatic apparatus and associated methods of use are disclosed and configured for storing and using clean energy derived from hydro-pneumatic fluid displacement. Because the principles of the invention may be practiced in a number of configurations beyond those shown and described, it is to be understood that the invention is not in any way limited by the exemplary embodiments, but is generally directed to a hydro-pneumatic apparatus and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the terms "about" and "approximately." As used herein, the terms "about" and "approximately" mean that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art, or at least encompassing a range of plus or minus ten percent above and below the value of the stated characteristic, item, quantity, parameter, property, or term.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term “comprising” (along with equivalent open-ended transitional phrases thereof such as “including,” “containing” and “having”) encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases “consisting of” or “consisting essentially of” in lieu of or as an amendment for “comprising.” When used in the claims, whether as filed or added per amendment, the closed-ended transitional phrase “consisting of” excludes any element, limitation, step, or feature not expressly recited in the claims. The closed-ended transitional phrase “consisting essentially of” limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase “comprising” is being defined as encompassing all the specifically recited elements, limitations, steps and/or features as well as any optional, additional unspecified ones. The meaning of the closed-ended transitional phrase “consisting of” is being defined as only including those elements, limitations, steps and/or features specifically recited in the claim, whereas the meaning of the closed-ended transitional phrase “consisting essentially of” is being defined as only including those elements, limitations, steps and/or features specifically recited in the claim and those elements, limitations, steps and/or features that do not materially affect the basic and novel characteristic(s) of the claimed subject matter.

Therefore, the open-ended transitional phrase “comprising” (along with equivalent open-ended transitional phrases thereof) includes within its meaning, as a limiting case, claimed subject matter specified by the closed-ended transitional phrases “consisting of” or “consisting essentially of.” As such, embodiments described herein or so claimed with the phrase “comprising” are expressly or inherently unambiguously described, enabled and supported herein for the phrases “consisting essentially of” and “consisting of.”

Any claims intended to be treated under 35 U.S.C. § 112(f) will begin with the words “means for,” but use of the term “for” in any other context is not intended to invoke treatment under 35 U.S.C. § 112 (f). Accordingly, Applicant reserves the right to pursue additional claims after filing this application, in either this application or in a continuing application.

It should be understood that any methods disclosed herein, along with the order in which the respective elements of any such method are performed, are purely exemplary. Depending on the implementation, they may be performed in any order or in parallel, unless indicated otherwise in the present disclosure.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents are based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

All of the material in this patent document issue subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

What is claimed is:

1. A hydro-pneumatic apparatus configured for generating energy derived from hydro-pneumatic fluid displacement, the apparatus comprising:

an at least one support frame configured for supporting an at least one control container, an at least one stationary container, an at least one first counterbalance container, and an at least one second counterbalance container connected in series with one another;

each of the at least one control container, stationary container, first counterbalance container and second counterbalance container being airtight and configured for containing one or both of a volume of a liquid and a volume of a gas;

each of the at least one stationary container fixedly engaged with or otherwise positioned on the support frame so as to have a substantially static vertical position relative to the support frame;

the at least one control container suspended from an at least one control pulley that is rotatably mounted to the support frame and configured for moving the at least one control container between one of an upper control position—wherein the at least one control container is positioned proximal to an upper end of the support frame—and a lower control position—wherein the at least one control container is positioned proximal to an opposing lower end of the support frame;

the at least one control container in mechanical communication with an at least one motor configured for automatically moving the at least one control container between the upper control position and the lower control position;

the at least one first counterbalance container suspended from an at least one counterbalance pulley that is rotatably mounted to the support frame and configured for moving the at least one first counterbalance container between one of an upper counterbalance position—wherein the at least one first counterbalance container is positioned proximal to the upper end of the support frame—and a lower counterbalance position— wherein the at least one first counterbalance container is positioned proximal to the lower end of the support frame;

the at least one second counterbalance container suspended from the at least one counterbalance pulley that is rotatably mounted to the support frame and configured for moving the at least one second counterbalance container between one of an upper counterbalance position—wherein the at least one second counterbalance container is positioned proximal to the upper end of the support frame—and a lower counterbalance position—wherein the at least one second counterbalance container is positioned proximal to the lower end of the support frame;

an at least one mechanical generator in mechanical communication with the at least one counterbalance pulley and configured for generating electricity as the at least one first counterbalance container and at least one second counterbalance container move between their respective upper and lower counterbalance positions;

a first one of the at least one control container in direct fluid communication with a first one of the at least one first counterbalance container via a liquid line positioned and configured for allowing a volume of liquid to pass between said control container and said first counterbalance container during use of the apparatus, a first end of the liquid line positioned proximal to a bottom surface of said control container, and an opposing second end of the liquid line positioned proximal to a bottom surface of said first counterbalance container;

the first one of the at least one first counterbalance container further in direct fluid communication with a first one of the at least one second counterbalance container via a gas line positioned and configured for allowing a volume of gas to pass between said first counterbalance container and said second counterbalance container during use of the apparatus, a first end of the gas line positioned proximal to a top surface of said first counterbalance container, and an opposing second end of the gas line positioned proximal to a top surface of said second counterbalance container;

the first one of the at least one second counterbalance container further in direct fluid communication with a first one of the at least one stationary container via a liquid line positioned and configured for allowing a volume of liquid to pass between said second counterbalance container and said stationary container during use of the apparatus, a first end of the liquid line positioned proximal to a bottom surface of said second counterbalance container, and an opposing second end of the liquid line positioned proximal to a bottom surface of said stationary container; and the first one of the at least one stationary container further in direct fluid communication with the first one of the at least one control container via a gas line positioned and configured for allowing a volume of gas to pass between said stationary container and said control container during use of the apparatus, a first end of the gas line positioned proximal to a top surface of said stationary container, and an opposing second end of the gas line positioned proximal to a top surface of said control container;

whereby, during use of the apparatus, with the at least one control container in the upper control position and filled with a volume of liquid, gravity causes the liquid within the at least one control container to flow into the at least one first counterbalance container, which causes a volume of gas within the at least one first counterbalance container to flow into the at least one second counterbalance container, which causes a volume of liquid within the at least one second counterbalance container to flow into the at least one stationary container, thereby causing the at least one first counterbalance container to become relatively heavier than the at least one second counterbalance container and move into the lower counterbalance position which, in turn, causes the at least one mechanical generator to generate electricity.

2. The hydro-pneumatic apparatus of claim 1, wherein the at least one control container is positioned on a corresponding at least one control platform that is suspended by an at least one control belt from the corresponding at least one control pulley.

3. The hydro-pneumatic apparatus of claim 1, further comprising a further at least one mechanical generator in mechanical communication with the at least one control pulley and configured for generating electricity as the at least one control container moves between the upper and lower control positions.

4. The hydro-pneumatic apparatus of claim 1, wherein the further at least one mechanical generator provides a generator axle and a generator wheel in mechanical communication with the at least one control pulley, whereby, as the at least one first control container moves between the upper and lower control positions, the at least one control pulley rotates which, in turn, rotates the generator wheel, causing the further at least one mechanical generator to generate electricity.

5. The hydro-pneumatic apparatus of claim 1, wherein the at least one first counterbalance container is positioned on a corresponding at least one first counterbalance platform that is suspended by an at least one counterbalance belt from the corresponding at least one counterbalance pulley.

6. The hydro-pneumatic apparatus of claim 5, wherein the at least one second counterbalance container is positioned on a corresponding at least one second counterbalance platform that is suspended by an at least one counterbalance belt from the corresponding at least one counterbalance pulley.

7. The hydro-pneumatic apparatus of claim 6, wherein:

a first end of the at least one counterbalance belt is engaged with the at least one first counterbalance platform;

an opposing second end of the at least one counterbalance belt is engaged with the at least one second counterbalance platform; and the apparatus further provides an at least one counterweight engaged with and extending between each of the at least one first counterbalance platform and second counterbalance platform.

8. The hydro-pneumatic apparatus of claim 1, wherein the at least one mechanical generator provides a generator axle and a generator wheel in mechanical communication with the at least one counterbalance pulley, whereby, as the at least one first counterbalance container and second counterbalance move between their respective upper and lower counterbalance positions, the at least one counterbalance pulley rotates which, in turn, rotates the generator wheel, causing the mechanical generator to generate electricity.

9. The hydro-pneumatic apparatus of claim 1, further comprising an at least one buoyancy generator positioned within one or more of the at least one control container, stationary container, first counterbalance container and second counterbalance container and configured for generating electricity, the at least one buoyancy generator comprising:

a buoyant generator platform configured for floating on a surface of liquid within the corresponding container;

a stator positioned on the generator platform;

a substantially horizontally oriented generator shaft extending axially through the stator;

a rotor positioned on the generator shaft; and a pair of generator cables rotatably engaged with the generator shaft, a first end of each generator cable anchored to a top surface of the corresponding container, and an opposing second end of each generator cable anchored to a bottom surface of the corresponding container;

whereby, as a level of liquid within the corresponding container rises and falls during use of the apparatus, the generator platform also rises and falls which, in turn, causes the generator cables to rotate the generator shaft relative to the stator, thereby generating electricity.

10. The hydro-pneumatic apparatus of claim 1, further comprising an at least one liquid turbine positioned in-line with one or more of the liquid lines and configured for generating electricity as liquid moves through the corresponding liquid line during use of the apparatus.

11. The hydro-pneumatic apparatus of claim 1, further comprising an at least one gas turbine positioned in-line with one or more of the gas lines and configured for generating electricity as gas moves through the corresponding gas line during use of the apparatus.

12. The hydro-pneumatic apparatus of claim 1, wherein the apparatus comprises a first control container, a plurality of first counterbalance containers, a plurality of second counterbalance containers, a plurality of stationary containers, and an at least one second control container connected in series with one another.

13. The hydro-pneumatic apparatus of claim 12, wherein:

the apparatus provides an equal quantity of first counterbalance containers and second counterbalance containers;

the apparatus provides a quantity of second control containers that is equal to the quantity of the first counterbalance containers or second counterbalance containers; and the apparatus provides a quantity of stationary containers that is equal to one less than the quantity of the first counterbalance containers or second counterbalance containers.

14. A hydro-pneumatic apparatus configured for generating energy derived from hydro-pneumatic fluid displacement, the apparatus comprising:

an at least one support frame configured for supporting an at least one control container, an at least one stationary container, an at least one first counterbalance container, and an at least one second counterbalance container connected in series with one another;

each of the at least one control container, stationary container, first counterbalance container and second counterbalance container being airtight and configured for containing one or both of a volume of a liquid and a volume of a gas;

each of the at least one stationary container fixedly engaged with or otherwise positioned on the support frame so as to have a substantially static vertical position relative to the support frame;

the at least one control container suspended from an at least one control pulley that is rotatably mounted to the support frame and configured for moving the at least one control container between one of an upper control position—wherein the at least one control container is positioned proximal to an upper end of the support frame—and a lower control position—wherein the at least one control container is positioned proximal to an opposing lower end of the support frame;

the at least one control container in mechanical communication with an at least one motor configured for automatically moving the at least one control container between the upper control position and the lower control position;

the at least one first counterbalance container suspended from an at least one counterbalance pulley that is rotatably mounted to the support frame and configured for moving the at least one first counterbalance container between one of an upper counterbalance position—wherein the at least one first counterbalance container is positioned proximal to the upper end of the support frame—and a lower counterbalance position—wherein the at least one first counterbalance container is positioned proximal to the lower end of the support frame;

the at least one second counterbalance container suspended from the at least one counterbalance pulley that is rotatably mounted to the support frame and configured for moving the at least one second counterbalance container between one of an upper counterbalance position—wherein the at least one second counterbalance container is positioned proximal to the upper end of the support frame—and a lower counterbalance position—wherein the at least one second counterbalance container is positioned proximal to the lower end of the support frame;

an at least one mechanical generator in mechanical communication with the at least one counterbalance pulley and configured for generating electricity as the at least one first counterbalance container and at least one second counterbalance container move between their respective upper and lower counterbalance positions;

a first one of the at least one control container in direct fluid communication with a first one of the at least one first counterbalance container via a liquid line positioned and configured for allowing a volume of liquid to pass between said control container and said first counterbalance container during use of the apparatus, a first end of the liquid line positioned proximal to a bottom surface of said control container, and an opposing second end of the liquid line positioned proximal to a bottom surface of said first counterbalance container;

the first one of the at least one first counterbalance container further in direct fluid communication with a first one of the at least one second counterbalance container via a gas line positioned and configured for allowing a volume of gas to pass between said first counterbalance container and said second counterbalance container during use of the apparatus, a first end of the gas line positioned proximal to a top surface of said first counterbalance container, and an opposing second end of the gas line positioned proximal to a top surface of said second counterbalance container;

the first one of the at least one second counterbalance container further in direct fluid communication with a first one of the at least one stationary container via a liquid line positioned and configured for allowing a volume of liquid to pass between said second counterbalance container and said stationary container during use of the apparatus, a first end of the liquid line positioned proximal to a bottom surface of said second counterbalance container, and an opposing second end of the liquid line positioned proximal to a bottom surface of said stationary container;

the first one of the at least one stationary container further in direct fluid communication with the first one of the at least one control container via a gas line positioned and configured for allowing a volume of gas to pass between said stationary container and said control container during use of the apparatus, a first end of the gas line positioned proximal to a top surface of said stationary container, and an opposing second end of the gas line positioned proximal to a top surface of said control container; and an at least one buoyancy generator positioned within one or more of the at least one control container, stationary container, first counterbalance container and second counterbalance container and configured for generating electricity, the at least one buoyancy generator comprising:

a buoyant generator platform configured for floating on a surface of liquid within the corresponding container;

a stator positioned on the generator platform;

a substantially horizontally oriented generator shaft extending axially through the stator;

a rotor positioned on the generator shaft; and a pair of generator cables rotatably engaged with the generator shaft, a first end of each generator cable anchored to a top surface of the corresponding container, and an opposing second end of each generator cable anchored to a bottom surface of the corresponding container;

whereby, as a level of liquid within the corresponding container rises and falls during use of the apparatus, the generator platform also rises and falls which, in turn, causes the generator cables to rotate the generator shaft relative to the stator, thereby generating electricity;

whereby, during use of the apparatus, with the at least one control container in the upper control position and filled with a volume of liquid, gravity causes the liquid within the at least one control container to flow into the at least one first counterbalance container, which causes a volume of gas within the at least one first counterbalance container to flow into the at least one second counterbalance container, which causes a volume of liquid within the at least one second counterbalance container to flow into the at least one stationary container, thereby causing the at least one first counterbalance container to become relatively heavier than the at least one second counterbalance container and move into the lower counterbalance position which, in turn, causes the at least one mechanical generator to generate electricity.

15. A hydro-pneumatic apparatus configured for generating energy derived from hydro-pneumatic fluid displacement, the apparatus comprising:

an at least one support frame configured for supporting a first control container, a plurality of stationary containers, a plurality of first counterbalance containers, a plurality of second counterbalance containers, and a plurality of second control containers connected in series with one another;

each of the first control container, stationary containers, first counterbalance containers, second counterbalance containers, and second control containers being airtight and configured for containing one or both of a volume of a liquid and a volume of a gas;

each of the stationary containers fixedly engaged with or otherwise positioned on the support frame so as to have a substantially static vertical position relative to the support frame;

the first control container suspended from a first control pulley that is rotatably mounted to the support frame and configured for moving the first control container between one of an upper control position—wherein the first control container is positioned proximal to an upper end of the support frame—and a lower control position—wherein the first control container is positioned proximal to an opposing lower end of the support frame;

the first control container in mechanical communication with an at least one motor configured for automatically moving the first control container between the upper control position and the lower control position;

the first counterbalance containers suspended from an at least one counterbalance pulley that is rotatably mounted to the support frame and configured for moving the first counterbalance containers between one of an upper counterbalance position—wherein the first counterbalance containers are positioned proximal to the upper end of the support frame—and a lower counterbalance position—wherein the first counterbalance containers are positioned proximal to the lower end of the support frame;

the second counterbalance containers suspended from the at least one counterbalance pulley that is rotatably mounted to the support frame and configured for moving the second counterbalance containers between one of an upper counterbalance position—wherein the second counterbalance containers are positioned proximal to the upper end of the support frame—and a lower counterbalance position—wherein the second counterbalance containers are positioned proximal to the lower end of the support frame;

the second control containers suspended from an at least one second control pulley that is rotatably mounted to the support frame and configured for moving the second control containers between one of an upper control position—wherein the second control containers are positioned proximal to the upper end of the support frame—and a lower control position—wherein the second control containers are positioned proximal to the lower end of the support frame;

an at least one mechanical generator in mechanical communication with the at least one counterbalance pulley and configured for generating electricity as the first counterbalance containers and second counterbalance containers move between their respective upper and lower counterbalance positions;

the first control container in direct fluid communication with a first one of the first counterbalance containers via a liquid line positioned and configured for allowing a volume of liquid to pass between the first control container and said first counterbalance container during use of the apparatus, a first end of the liquid line positioned proximal to a bottom surface of the first control container, and an opposing second end of the liquid line positioned proximal to a bottom surface of said first counterbalance container;

the first one of the first counterbalance containers further in direct fluid communication with a first one of the stationary containers via a gas line positioned and configured for allowing a volume of gas to pass between said first counterbalance container and said stationary container during use of the apparatus, a first end of the gas line positioned proximal to a top surface of said first counterbalance container, and an opposing second end of the gas line positioned proximal to a top surface of said stationary container;

the first one of the stationary containers further in direct fluid communication with a further one of the first counterbalance containers via a liquid line positioned and configured for allowing a volume of liquid to pass between said stationary container and said first counterbalance container during use of the apparatus, a first end of the liquid line positioned proximal to a bottom surface of said stationary container, and an opposing second end of the liquid line positioned proximal to a bottom surface of said first counterbalance container;

remaining ones of the first counterbalance containers and stationary containers thereafter interconnected in series in an alternating arrangement, such that further liquid lines extend between and interconnect further ones of the remaining stationary containers and first counterbalance containers proximal to a bottom surface of each of said remaining stationary containers and first counterbalance containers, while further gas lines extend between and interconnect further ones of the remaining first counterbalance containers and stationary containers proximal to a top surface of each of said remaining first counterbalance containers and stationary containers;

a last one of the first counterbalance containers further in direct fluid communication with a first one of the second counterbalance containers via a gas line positioned and configured for allowing a volume of gas to pass between said first counterbalance container and said second counterbalance container during use of the apparatus, a first end of the gas line positioned proximal to a top surface of said first counterbalance container, and an opposing second end of the gas line positioned proximal to a top surface of said second counterbalance container;

the first one of the second counterbalance containers further in direct fluid communication with a first one of the second control containers via a liquid line positioned and configured for allowing a volume of liquid to pass between said second counterbalance container and said second control container during use of the apparatus, a first end of the liquid line positioned proximal to a bottom surface of said second counterbalance container, and an opposing second end of the liquid line positioned proximal to a bottom surface of said second control container;

the first one of the second control containers further in direct fluid communication with a further one of the second counterbalance containers via a gas line positioned and configured for allowing a volume of gas to pass between said second control container and said second counterbalance container during use of the apparatus, a first end of the gas line positioned proximal to a top surface of said second control container, and an opposing second end of the gas line positioned proximal to a top surface of said second counterbalance container;

remaining ones of the second counterbalance containers and second control containers thereafter interconnected in series in an alternating arrangement, such that further gas lines extend between and interconnect further ones of the remaining second control containers and second counterbalance containers proximal to a top surface of each of said remaining second control containers and second counterbalance containers, while further liquid lines extend between and interconnect further ones of the remaining second counterbalance containers and second control containers proximal to a bottom surface of each of said remaining second counterbalance containers and second control containers; and a last one of the second control containers further in direct fluid communication with the first control container via a gas line positioned and configured for allowing a volume of gas to pass between said second control container and the first control container during use of the apparatus, a first end of the gas line positioned proximal to a top surface of said second control container, and an opposing second end of the gas line positioned proximal to a top surface of the first control container.

* * * * *